(12) United States Patent
Hall et al.

(10) Patent No.: US 12,677,752 B2
(45) Date of Patent: Jul. 14, 2026

(54) BALE HANDLING SYSTEM FOR HIGH CAPACITY BALER

(71) Applicant: Great Plains Manufacturing, Inc., Salina, KS (US)

(72) Inventors: Jeffrey T. Hall, Salina, KS (US); Brian D. Olander, Assaria, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 373 days.

(21) Appl. No.: 18/450,107

(22) Filed: Aug. 15, 2023

(65) Prior Publication Data

US 2024/0057525 A1 Feb. 22, 2024

Related U.S. Application Data

(60) Provisional application No. 63/399,330, filed on Aug. 19, 2022.

(51) Int. Cl.
*A01F 15/08* (2006.01)
*A01D 85/00* (2006.01)
*A01F 15/04* (2006.01)

(52) U.S. Cl.
CPC ........ *A01F 15/0875* (2013.01); *A01D 85/005* (2013.01); *A01F 15/04* (2013.01); *A01D 2085/007* (2013.01)

(58) Field of Classification Search
CPC ... A01F 15/0875; A01F 15/04; A01D 85/005; A01D 2085/007
See application file for complete search history.

(56) References Cited

U.S. PATENT DOCUMENTS

| | | | |
|---|---|---|---|
| 2,736,159 | A | 2/1956 | Marshall |
| 3,945,507 | A | 3/1976 | Olsen et al. |
| 5,740,901 | A | 4/1998 | Lazzarotti et al. |
| 5,829,238 | A | 11/1998 | Branson |

(Continued)

FOREIGN PATENT DOCUMENTS

KR 10-2113531 5/2020

OTHER PUBLICATIONS

YouTube Video, Traffic Cop, SpanTech LLC, https://www.youtube.com/watch?v=zH89wyQSKOQ, Jan. 25, 2017.

(Continued)

*Primary Examiner* — Nicole Coy
*Assistant Examiner* — Jennifer A Railey
(74) *Attorney, Agent, or Firm* — Hovey Williams LLP; Kameron D. Kelly

(57) ABSTRACT

A bale singulator for a baling machine. The baling machine comprises a landing section configured to receive (i) a first series of first individual bales from a first baling chamber, and (ii) a second series of second individual bales from a second baling chamber. The baling machine further comprises an exit section configured to receive the first and second individual bales from the landing section and to form a single row of the first and second individual bales. The exit section includes a stop assembly comprising a first stop element configured to selectively restrict movement of the first individual bales. The stop assembly is configured such when the second individual bales are passing through said exit section, the first stop element is restricting movement of the first individual bales.

25 Claims, 19 Drawing Sheets

(56) References Cited

U.S. PATENT DOCUMENTS

| | | | |
|---|---|---|---|
| 6,134,870 | A | 10/2000 | Lippens et al. |
| 10,757,862 | B2 | 9/2020 | Lynch |
| 11,317,567 | B2 | 5/2022 | Olander et al. |
| 2007/0217893 | A1 | 9/2007 | Parrish, Jr. |
| 2018/0070533 | A1* | 3/2018 | Lynch .................... A01D 90/12 |
| 2020/0214220 | A1* | 7/2020 | Olander ............... A01D 89/002 |

OTHER PUBLICATIONS

Phiber Accumulator, https://phiber.ca/testing/, Phiber Manufacturing, Inc., Crystal City, MB, Canada.
Traffic Cop Conveyor, Control how lanes merge to keep objects from colliding, https://www.cisco-eagle.com/category/8259/traffic-cop-merge-conveyor, Cisco-Eagle, 2024.
Conveyor 101: What is a Traffic Cop?, https://www.nerconconveyors.com/Blog-Articles/Conveyor-101-What-is-a-Traffic-Cop1.htm#:~:text=The%20Traffic%20Cop%20is%20a,handles%20bags%2C%20boxes%20and%20cases, Nercon, May 23, 2012.
YouTube Video, Dillin Table Top with Traffic Cop Merge, https://www.youtube.com/watch?v=c-JQGzclSgw, Dec. 17, 2023
PCT Search Report and Written Opinion dated Dec. 8, 2023 for related PCT Patent Application No. PCT/US2023/072226, 11 pages.

* cited by examiner

BALE HANDLING SYSTEM FOR HIGH CAPACITY BALER

CROSS-REFERENCE TO RELATED APPLICATION

The present non-provisional patent application claims priority benefit to U.S. Provisional Patent Application Ser. No. 63/399,330, filed on Aug. 19, 2022, and entitled "BALE HANDLING SYSTEM FOR HIGH CAPACITY BALER." The entirety of the above-identified provisional patent application is hereby incorporated by reference into the present non-provisional patent application.

FIELD OF THE INVENTION

Embodiments of the present invention are generally directed to high capacity balers. More particularly, embodiments of the present invention are directed to bale handling systems for high capacity balers, such that the balers can efficiently manipulate a plurality of bales into a single row of bales.

BACKGROUND OF THE INVENTION

Balers are agricultural implements configured to form bales of crop material (e.g., square or round-shaped bales) from crop material having been cut and laid in a field. Most currently available square balers use a single baling chamber with a single gearbox, a single plunger, and a single knotter assembly to produce one square bale at a time. To increase baling efficiency and output, certain variations of high-capacity balers have recently been developed. In some instances, these high-capacity balers comprise multiple baling chambers from which a plurality of bales can be simultaneously produced. Unfortunately, however, it can be problematic to sort or otherwise handle the plurality of bales once the bales have been formed and ejected from the multiple baling chambers.

For example, in some instances, it is preferable to manipulate the plurality of bales into a single row of bales that can be deposited onto the ground/field. Secondary equipment that is used to pick up the bales from the field can, thereby, pick up the bales more efficiently. As such, there is a need for a bale handling system for high-capacity balers that can manipulate a plurality of bales received from multiple baling chambers and arrange those bales into a single row.

SUMMARY OF THE INVENTION

In one embodiment of the present invention, there is provided a bale singulator for a baling machine configured to process crop material into square bales. The bale singulator comprises a landing section configured to receive (i) a first series of first individual bales from a first baling chamber of the baler, and (ii) a second series of second individual bales from a second baling chamber of the baler. The bale singulator additionally comprises an exit section configured to receive the first and second individual bales from the landing section and to form a single row of the first and second individual bales. The exit section includes a stop assembly comprising a first stop element configured to selectively restrict movement of the first individual bales. The stop assembly is configured such when the second individual bales are passing through said exit section, the first stop element is restricting movement of the first individual bales.

In another embodiment of the present invention, there is provided a bale singulator for a baling machine configured to process crop material into square bales. The bale singulator comprises a landing section configured to receive (i) a first series of first individual bales from a first baling chamber of the baler, and (ii) a second series of second individual bales from a second baling chamber of the baler. The bale singulator additionally comprises an exit section configured to receive the first and second individual bales from said landing section and to form a single row of the first and second individual bales. The exit section includes a stop assembly comprising a first stop element and a second stop element each configured to selectively restrict or permit bales to travel past the stop assembly. The stop assembly is configured such that the first stop element and the second stop element cannot simultaneously permit bales to travel past the stop assembly.

In a further embodiments of the present invention, there is provided a method of handling a plurality of bales of crop material. The method comprises a step of forming bales of crop material within a first baling chamber and within a second baling chamber of a baler. An additional step includes ejecting a first series of first individual bales from the first baling chamber onto a landing section of a singulating system and ejecting a second series of second individual bales from the second baling chamber onto the landing section of the singulating system. The first individual bales and the second individual bales are positioned side-by-side on the landing section of the singulating system. A further step includes selectively restricting, via a stop assembly associated with the singulating system, bales from one of the first individual bales and the second individual bales from traveling past the stop assembly, and simultaneously permitting bales from the other of the first individual bales and the second individual bales to travel past the stop assembly.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein.

3

Figure 4:
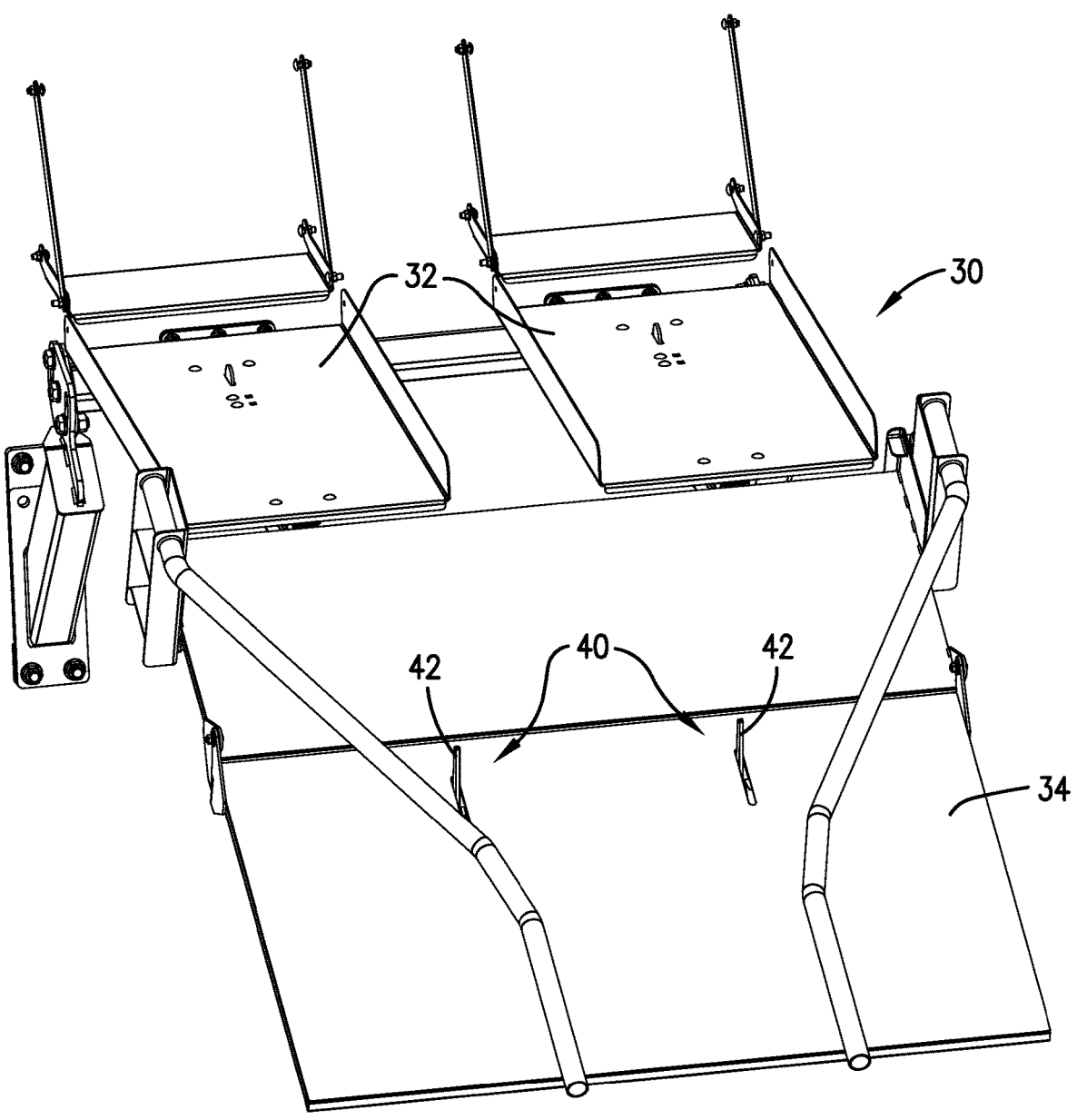
Figure 5:
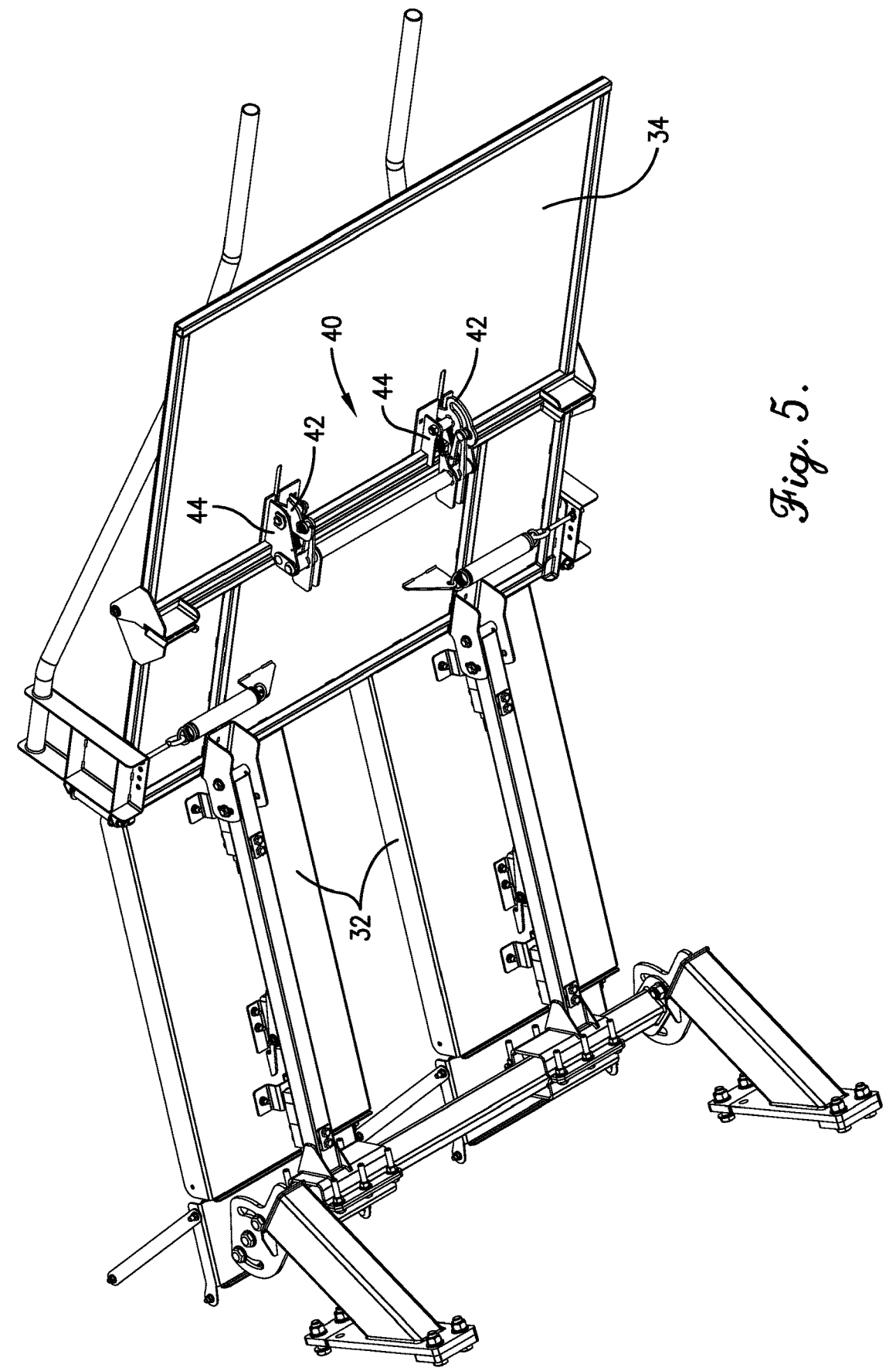
Figure 6:
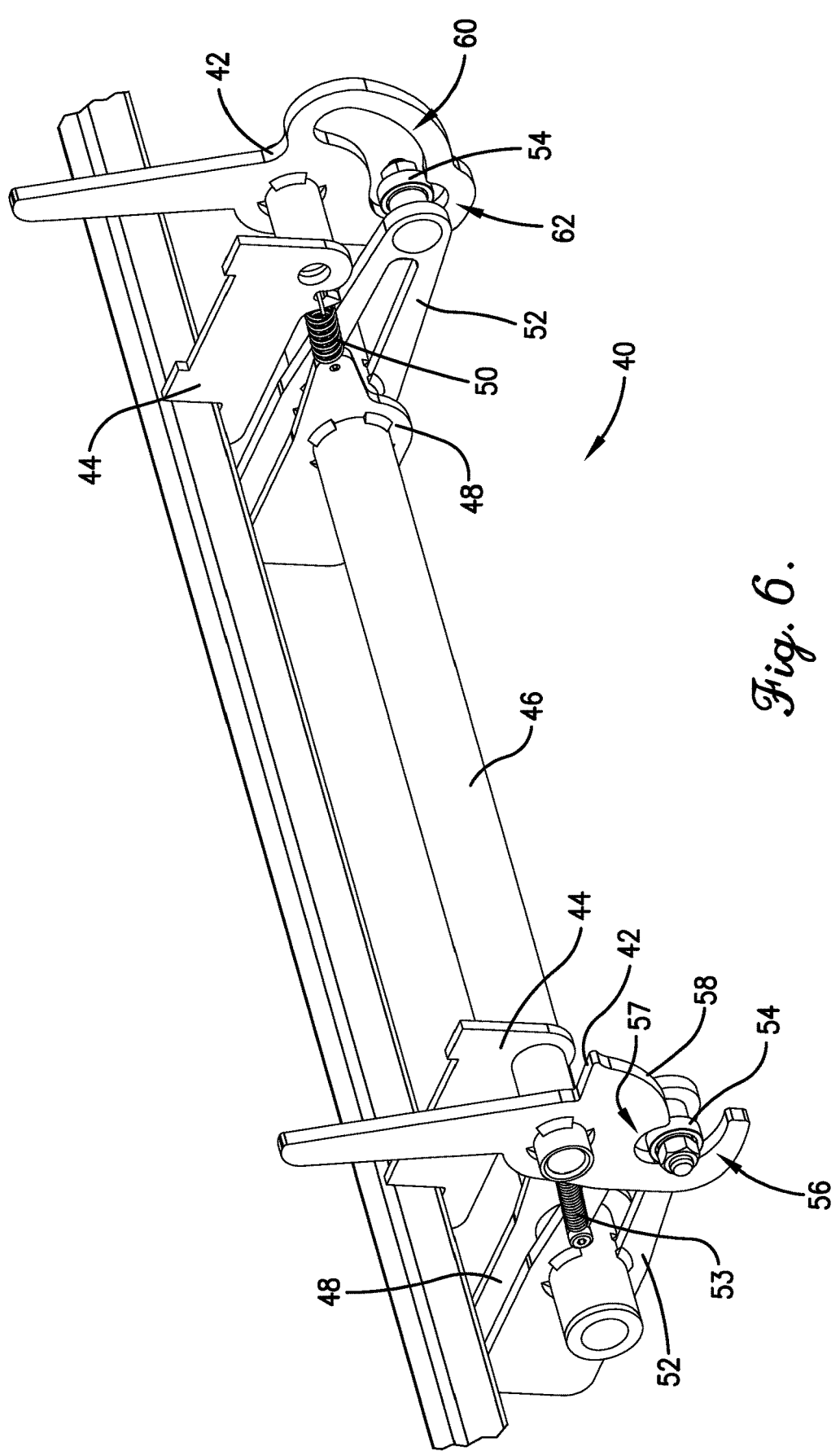
Figure 7:
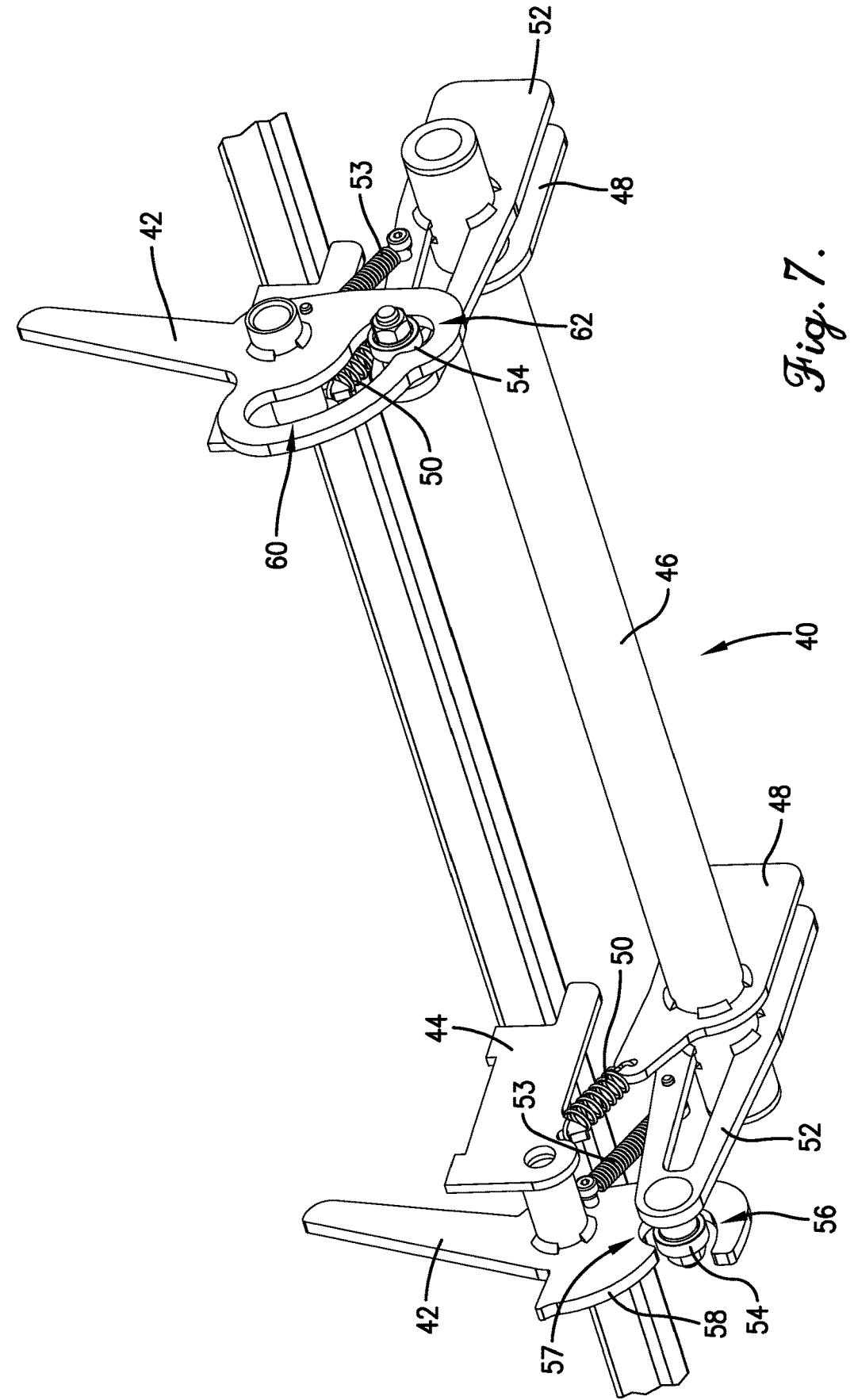
Figure 8:
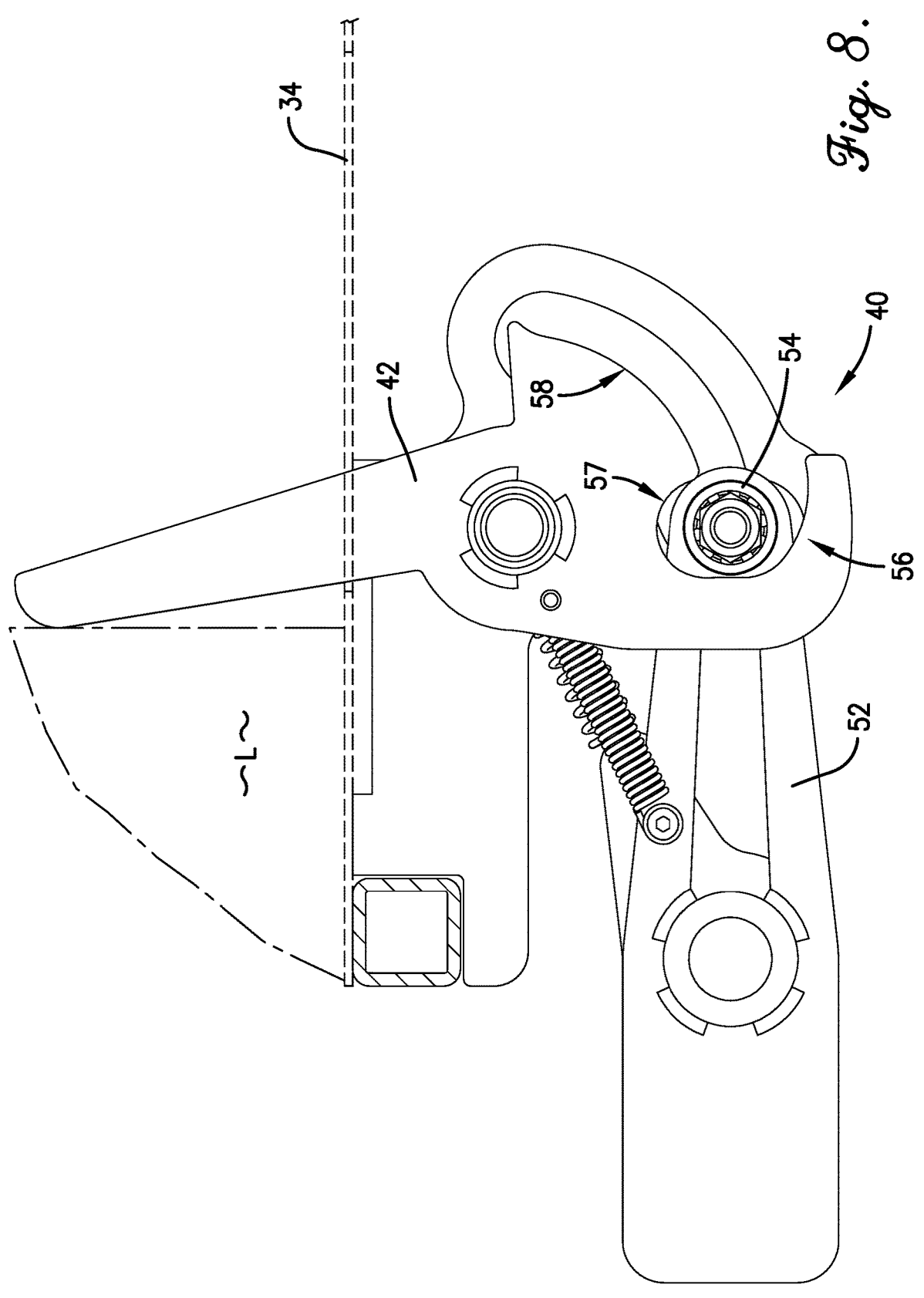
Figure 9:
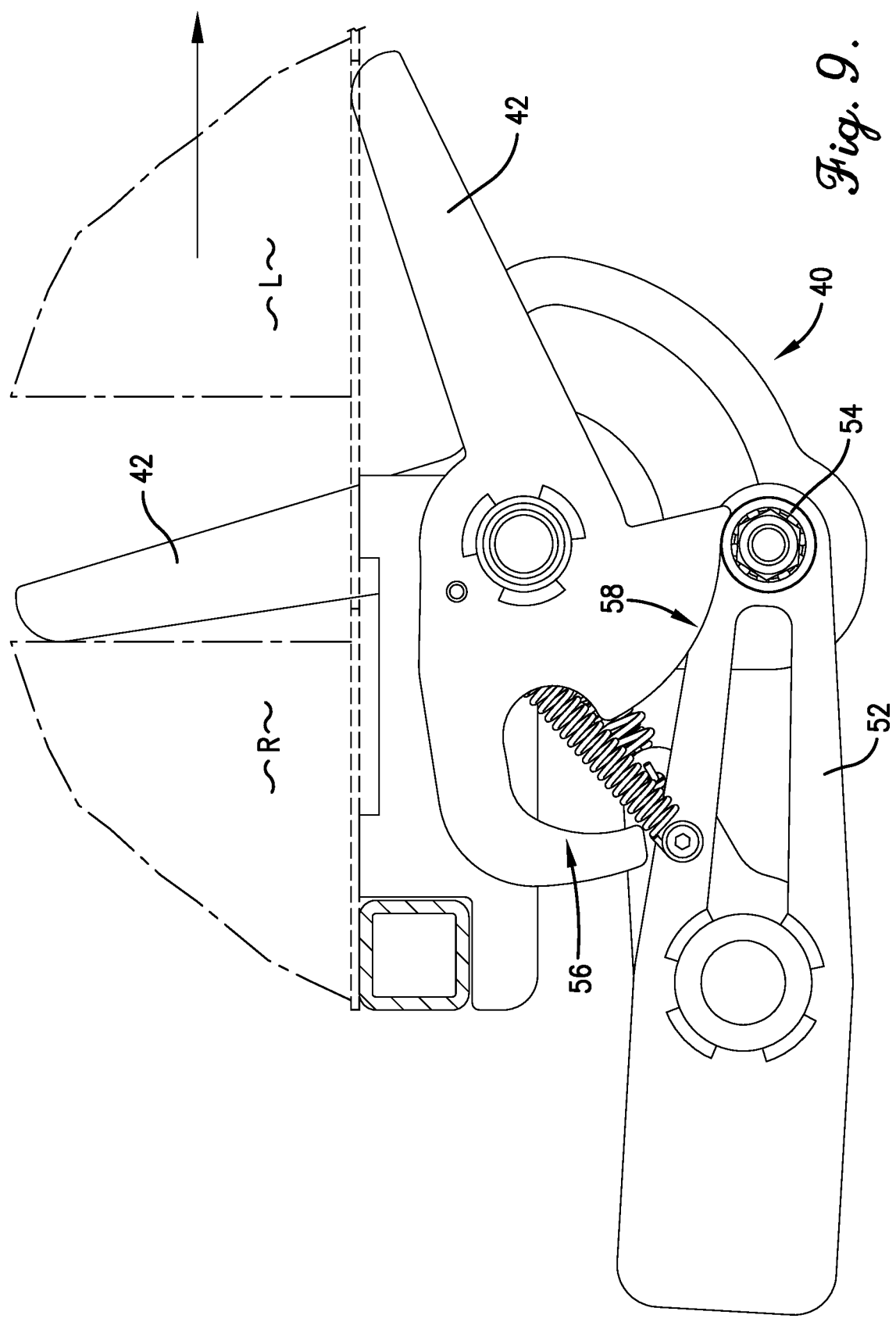
Figure 10:
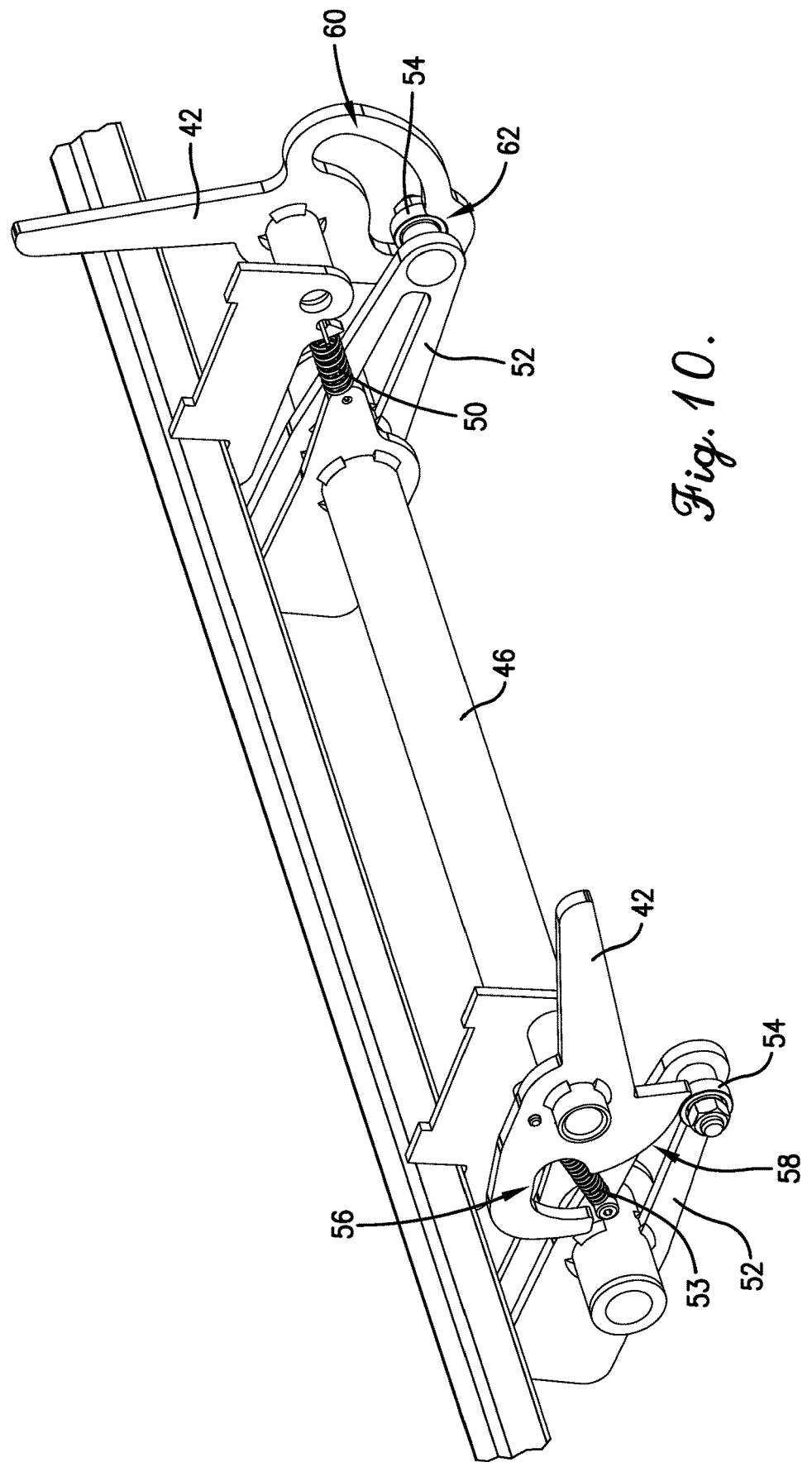
Figure 11:
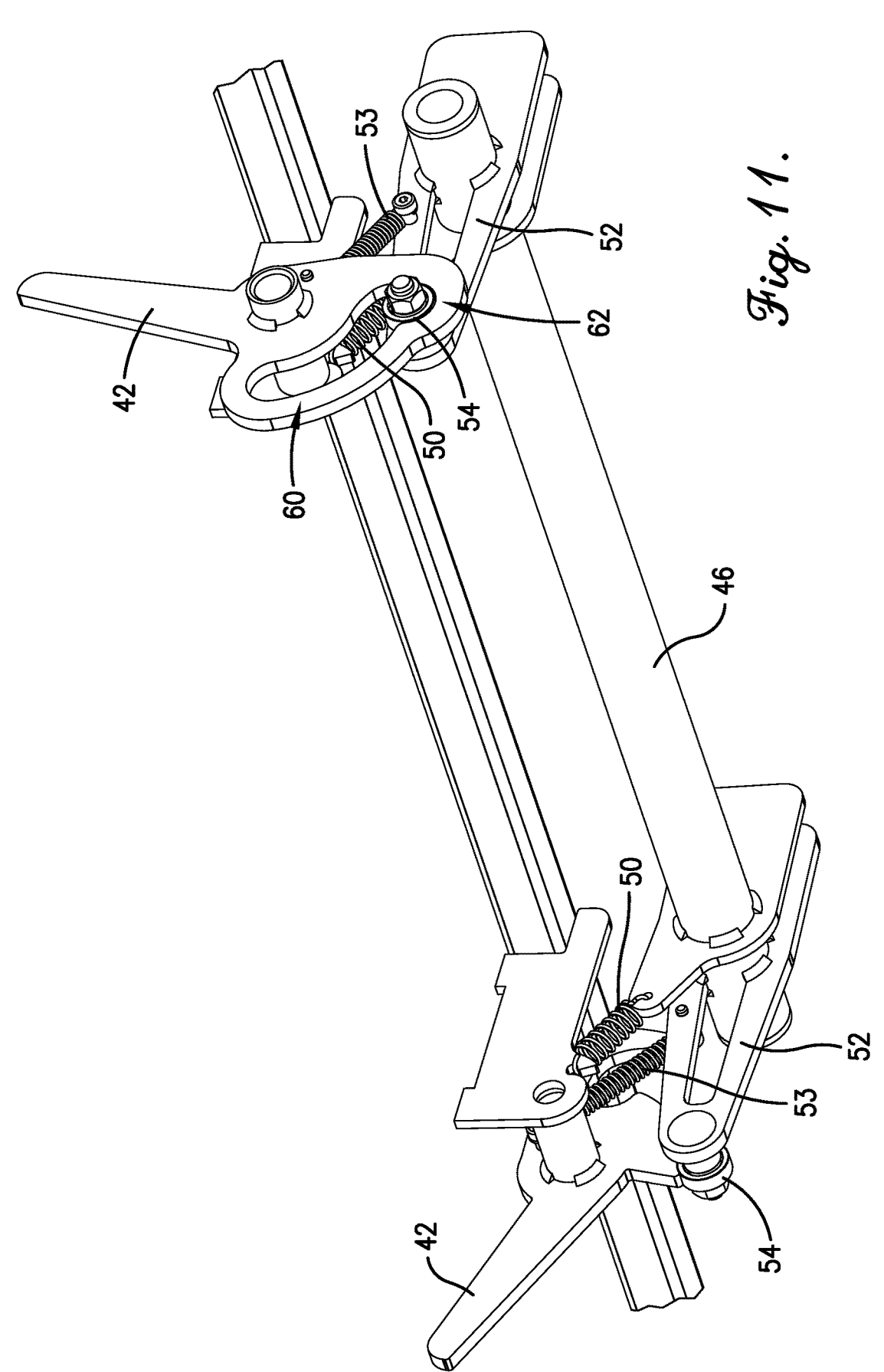
Figure 12:
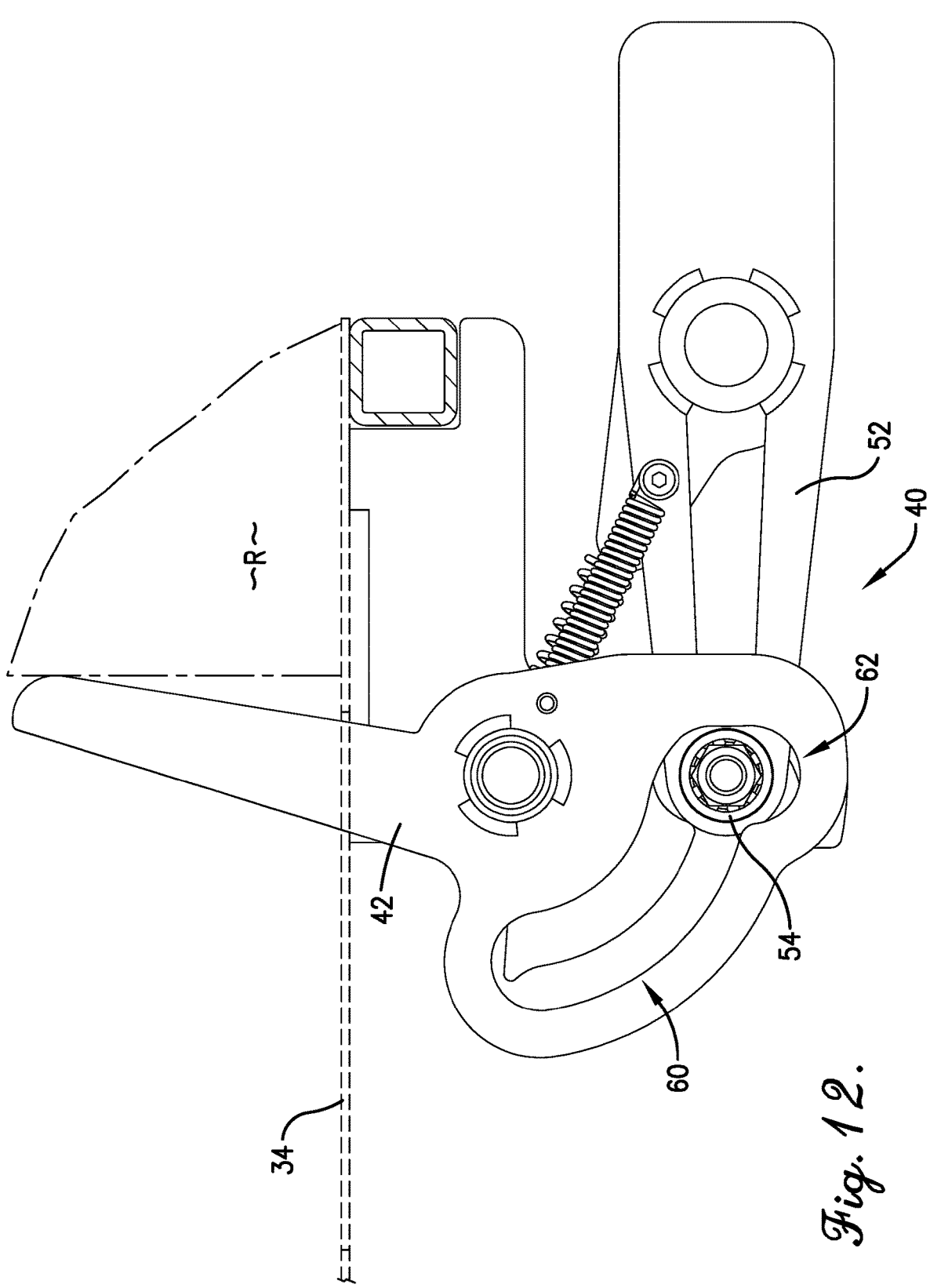
Figure 13:
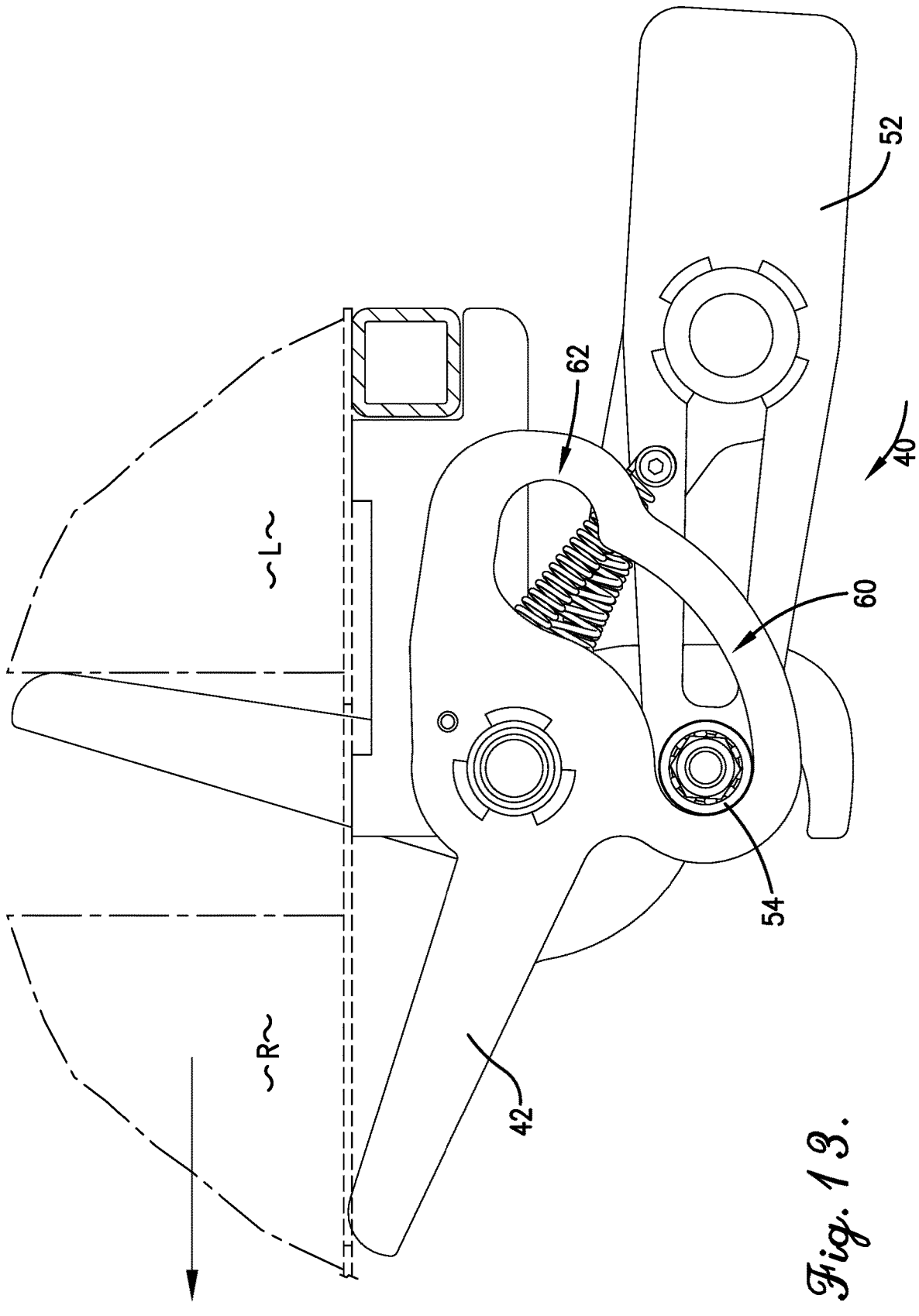
Figure 14:
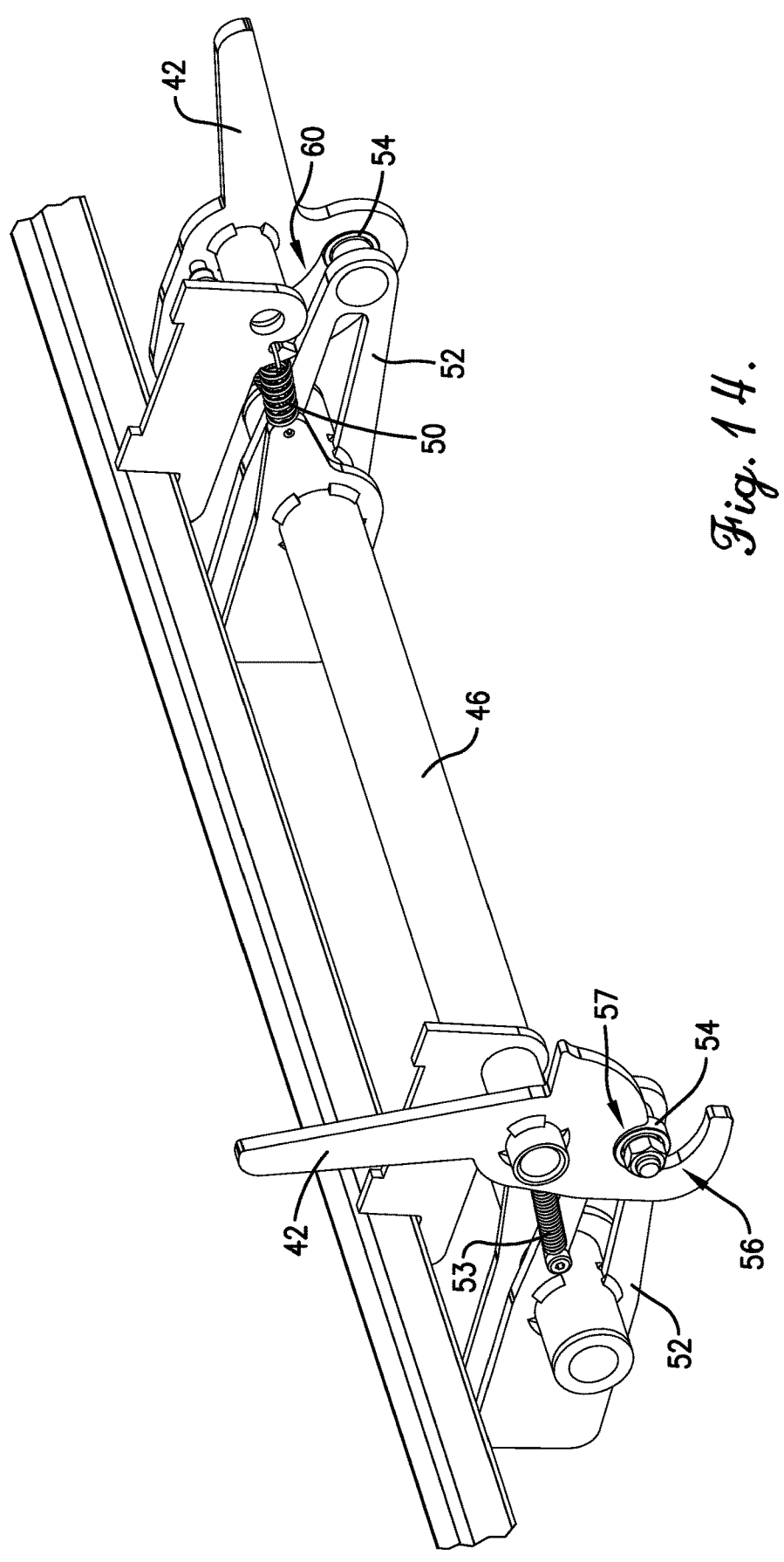
Figure 15:
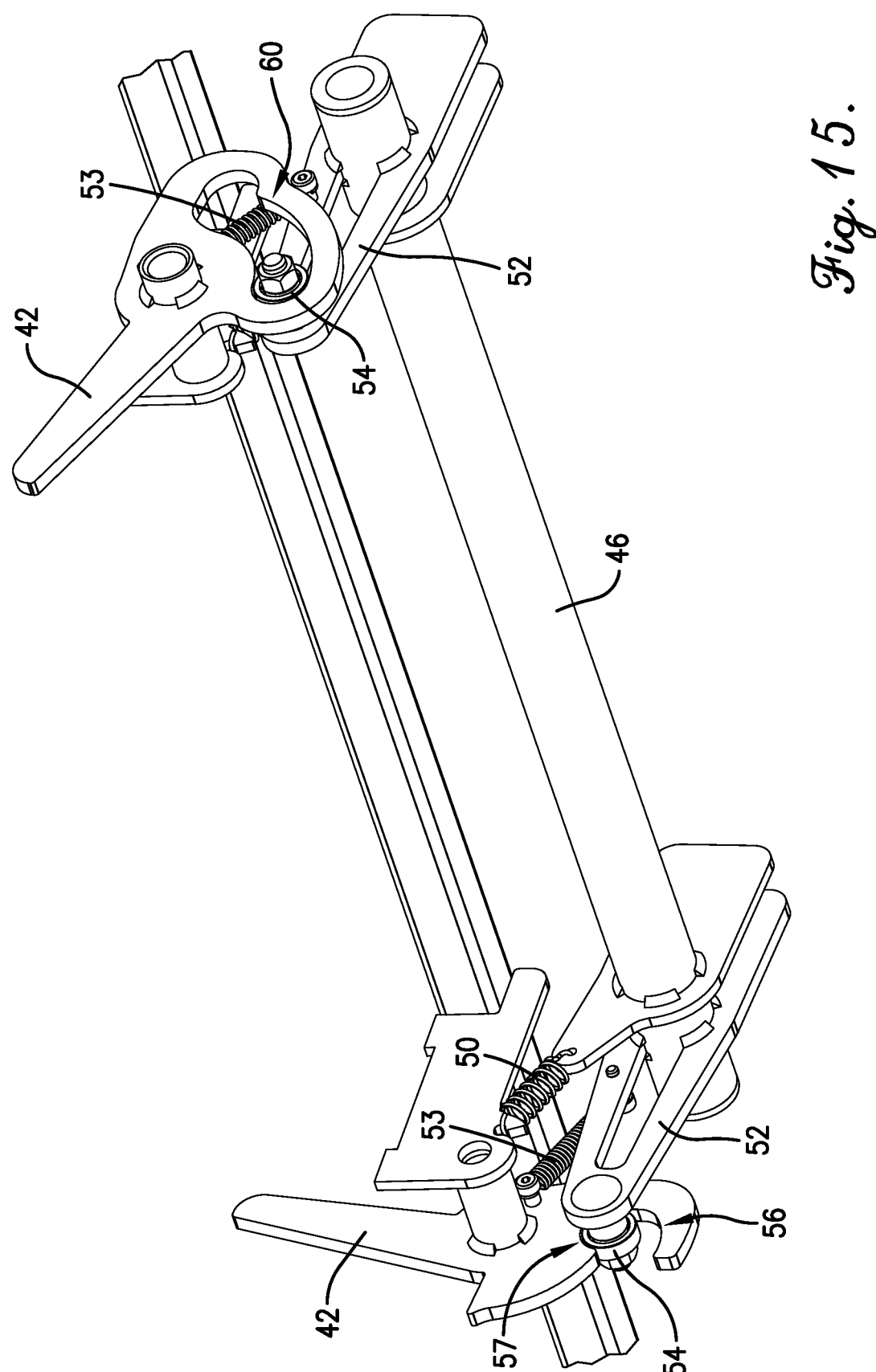
Figure 16:
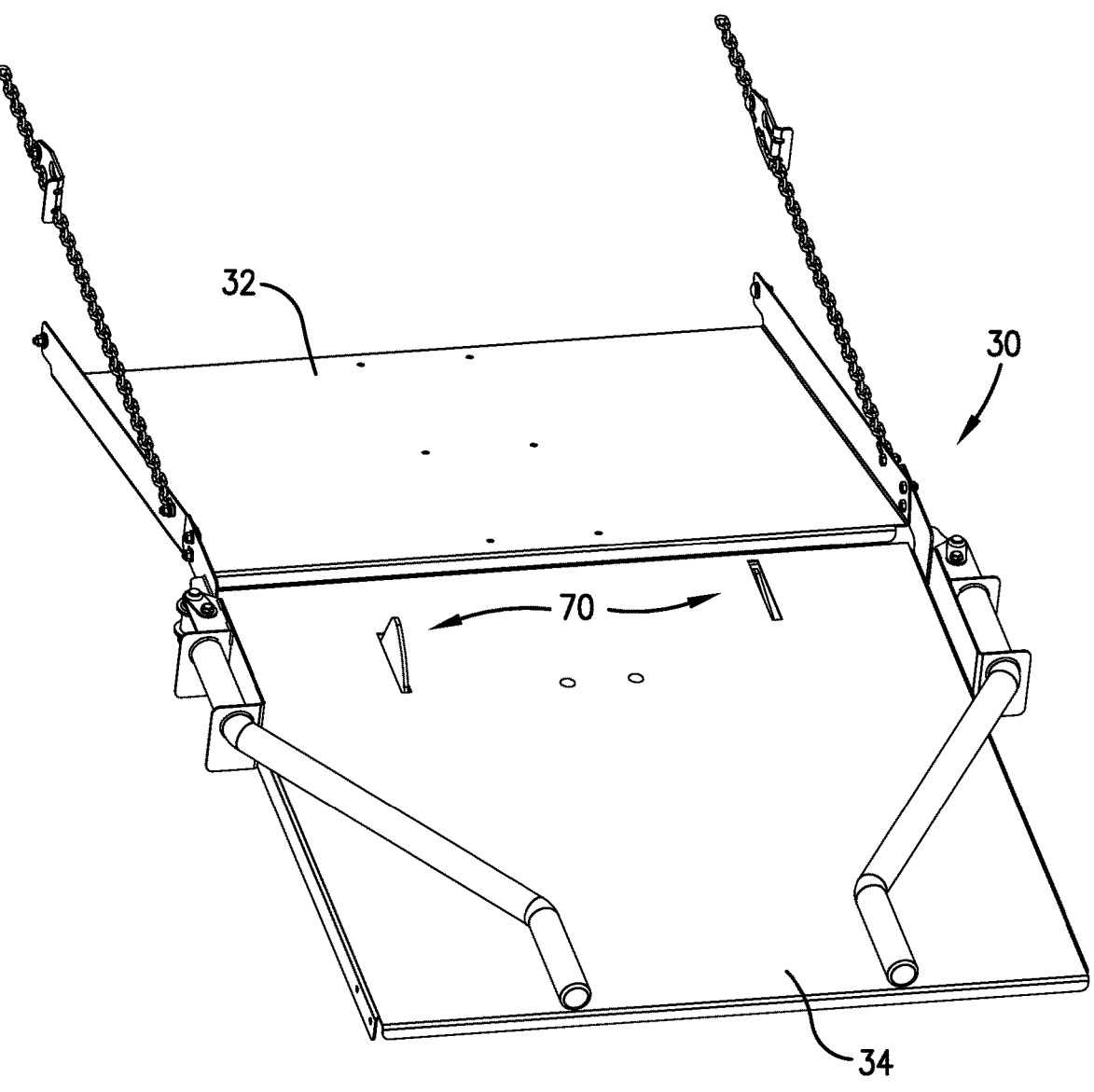
Figure 17:
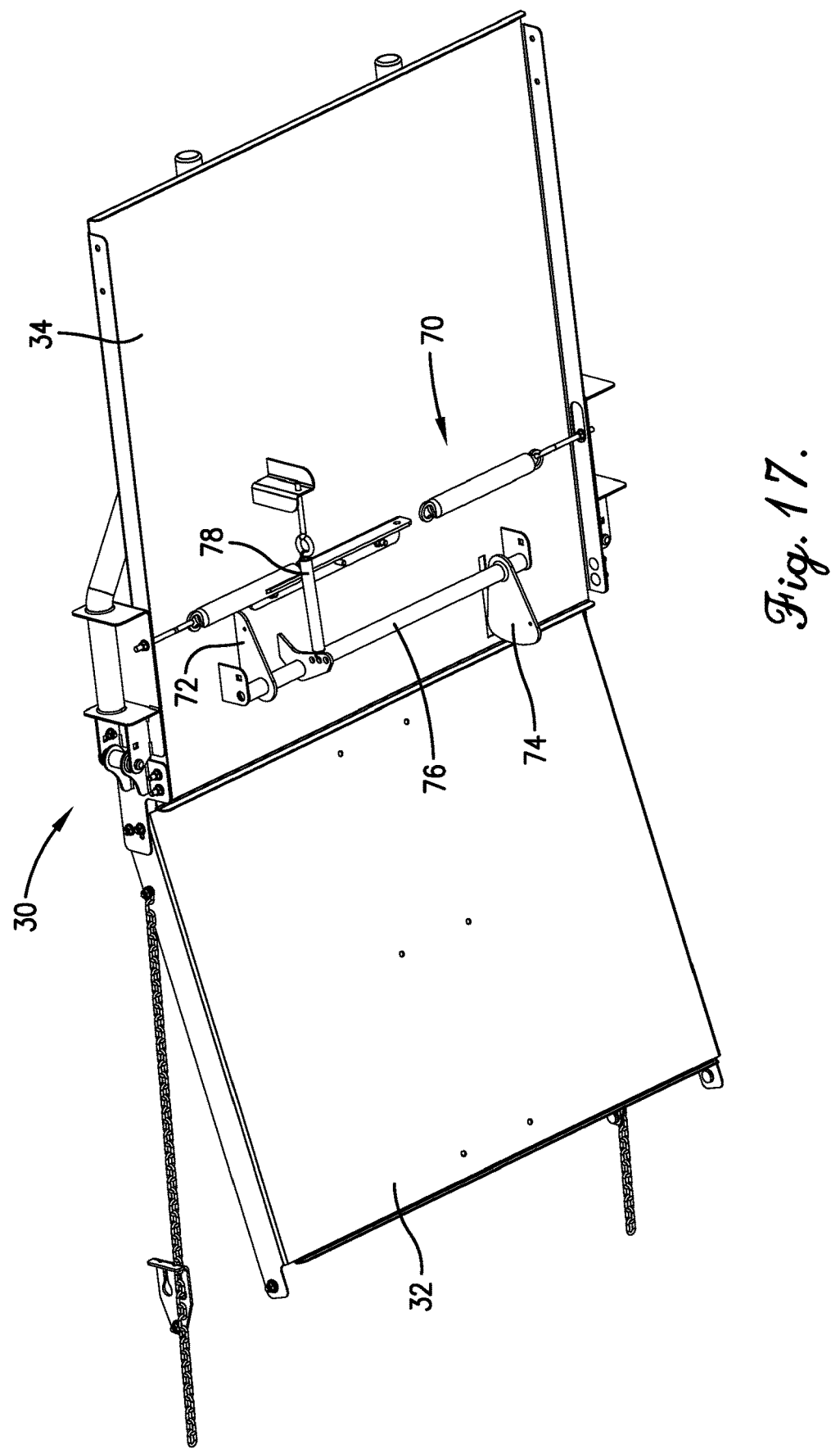
Figure 18:
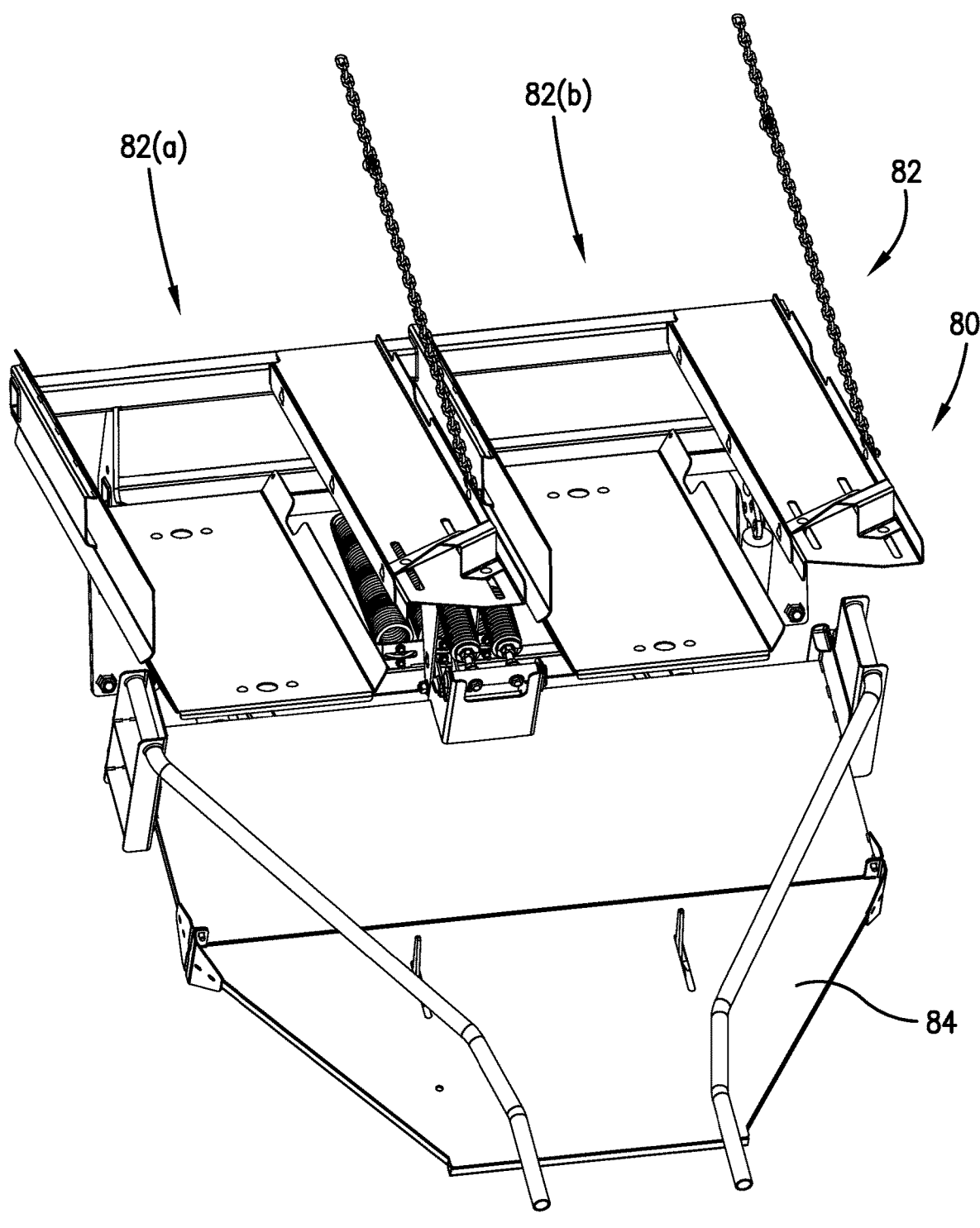
Figure 19:
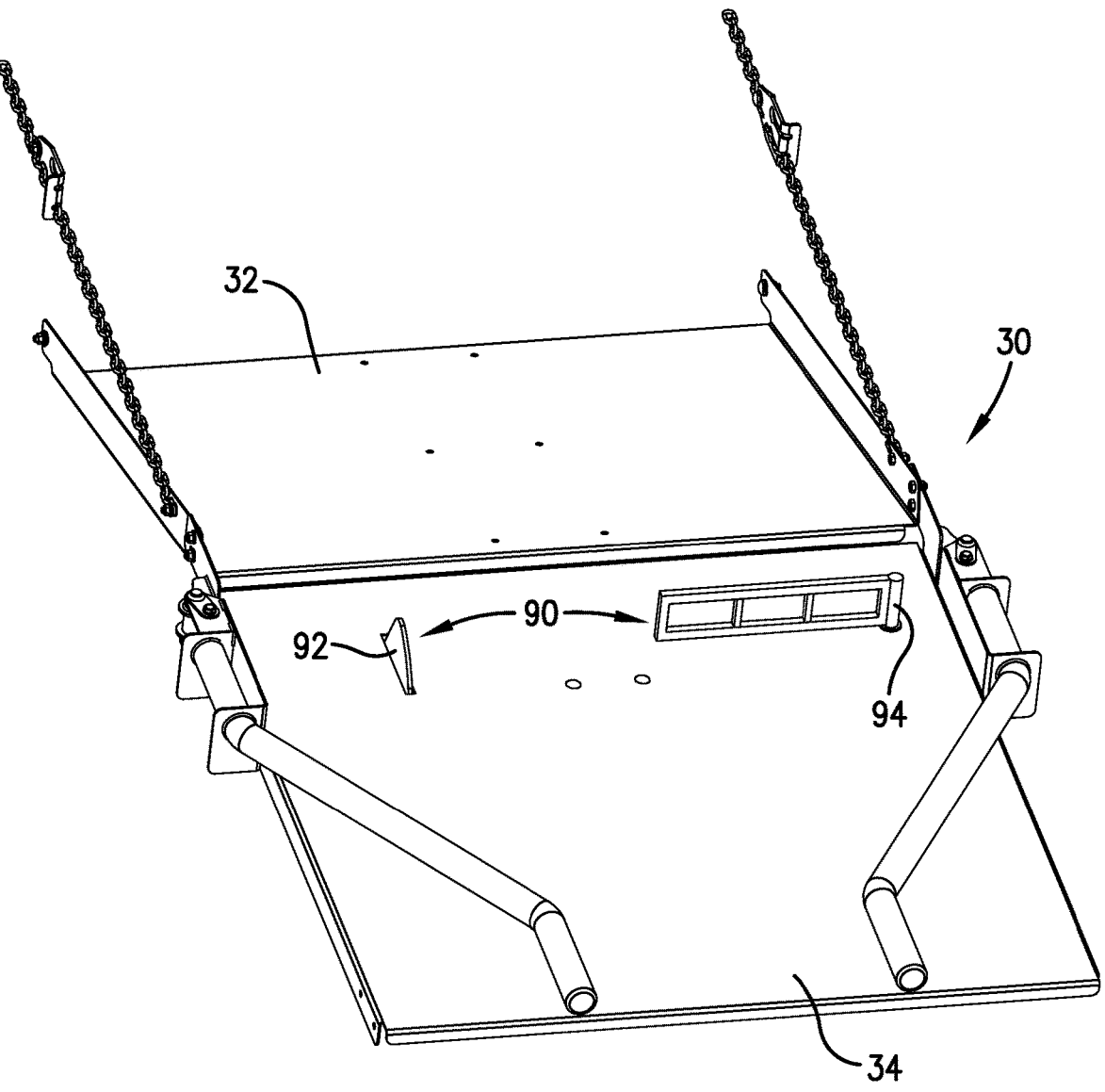

FIG. 4 is a top perspective view of a bale handling system in the form of a singulator according to embodiments of the present invention, with the singulator including a stop assembly configured to allow only one bale from a pair of side-by-side bales to pass by the stop assembly and through the singulator;

FIG. 5 is a bottom perspective view of the singulator and stop assembly from FIG. 4;

FIG. 6 is a left side perspective view of the stop assembly from FIGS. 4 and 5, with the stop assembly including a left side stop element and a right side stop element both in an extended position;

FIG. 7 is a right side perspective view of the stop assembly from FIG. 6;

FIG. 8 is a left side elevation view of the stop assembly from FIGS. 6 and 7 integrated with an exit section of the singulator from FIGS. 4 and 5, with a bale (in broken line) illustrated sliding over a top surface of the exit section (also in broken line) and making contact with the left side stop element from the stop assembly, with the left side stop element shown in an extended position;

FIG. 9 is a left side elevation view of the stop assembly and singulator from FIG. 8, with the bale illustrated forcing the left side stop element down to a retracted position such that the bale can pass by the stop assembly, wherein the figure further illustrates a second bale (in broken line) being prevented from passing by the stop assembly by the right side stop element shown locked in an extended position;

FIG. 10 is a left side perspective view of the stop assembly from FIGS. 8 and 9, with the left side stop element shown in the retracted position and the right side stop element shown in the extended position;

FIG. 11 is a right side perspective view of the stop assembly from FIG. 10;

FIG. 12 is a right side elevation view of the stop assembly from FIGS. 6 and 7 integrated with an exit section of the singulator from FIGS. 4 and 5, with a bale (in broken line) illustrated sliding over a top surface of the exit section (also in broken line) and making contact with the right side stop element from the stop assembly, with the right side stop element shown in an extended position;

FIG. 13 is a right side elevation view of the stop assembly and singulator from FIG. 12, with the bale illustrated forcing the right side stop element down to a retracted position such that the bale can pass by the stop assembly, wherein the figure further illustrates a second bale (in broken line) being prevented from passing by the stop assembly by the left side stop element shown locked in an extended position;

FIG. 14 is a left side perspective view of the stop assembly from FIGS. 12 and 13, with the right side stop element shown in the retracted position and the left side stop element shown in the extended position;

FIG. 15 is a right side perspective view of the stop assembly from FIG. 14;

FIG. 16 is a top perspective view of a bale handling system in the form of a singulator according to embodiments of the present invention, with the singulator including a stop assembly, according to another embodiment of the present invention, configured to allow only one bale from a pair of side-by-side bales to pass by the stop assembly and through the singulator;

FIG. 17 is a bottom perspective view of the singulator and stop assembly from FIG. 16;

FIG. 18 is a rearward perspective view of another singulator according to embodiments of the present invention, with the singulator configured to rotate bales one-quarter turn after the bales have been ejected from baling chambers of a baler; and FIG. 19 is a top perspective view of a bale handling system in the form of a singulator according to embodiments of the present invention, with the singulator including a stop assembly, according to yet another embodiment of the present invention, configured to allow only one bale from a pair of side-by-side bales to pass by the stop assembly and through the singulator.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
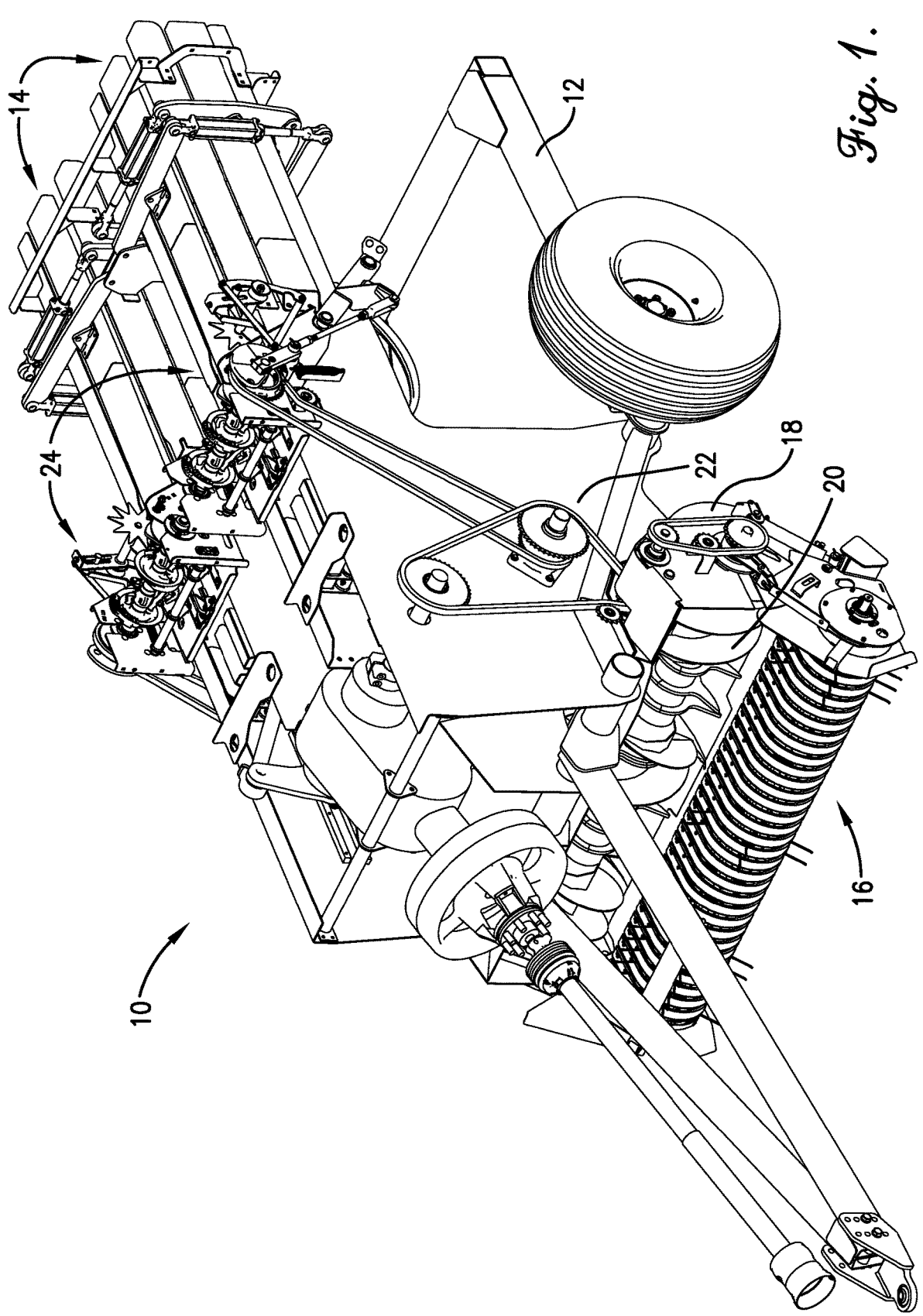
FIG. 1 is a front, left side perspective view of a baler for use with embodiments of the present invention.

Broadly, embodiments of the present invention are directed to bale handling systems for agricultural implements in the form of crop balers, such as baler 10 illustrated in FIG. 1. The baler 10 is configured to simultaneously form two or more bales of crop material from a single windrow of crop material lying on the ground. In some embodiments, the baler 10 will be configured to form square bales of crop material, such that the baler 10 is a square baler. Although the baler 10 is described in more detail below, the baler 10 may include other features and functions of the baler described in U.S. Patent Appl. Publ. No. 2020/0214220, which is incorporated herein by reference in its entirety.

In more detail, the baler 10 may include a wheeled chassis 12 including an axle and a pair of laterally spaced wheels that support the chassis 12 above the ground. The baler 10 may additionally comprise a plurality of baling chambers 14, extending generally in a fore-and-aft direction and which are supported on top of the chassis 12. As will be described in more detail below, the baling chambers 14 are configured as bale forming chambers in which small, square bales of crop material can be formed. Because the baler 10 includes a plurality of baling chambers 14, the baler 10 may be referred to as a "high capacity" baler capable of simultaneously forming multiple bales of crop material. In some specific embodiments, the baler 10 will include two baling chambers 14 supported on the chassis 12 and positioned between the wheels. As will be described in more detail below, the plurality of baling chambers 14 permits the baler 10 to simultaneously form a plurality of bales of crop material. In some embodiments, the plurality of bales of crop material may be formed by the baler 10 after picking up crop material from a single windrow of crop material.

In some embodiments, the baler 10 may be pulled or pushed by a towing vehicle (e.g., a tractor, which is not shown in the drawings). In alternative embodiments, the baler 10 may be self-propelled. It will be appreciated that, as used herein, the terms "back," "rear," or "rearward" refer to a direction towards the open ends of the baling chambers 14 from which bales of crop material are ejected from the baler, while the terms "front" or "forward" refers to an opposite direction towards a front end of the baler 10. Correspondingly, the terms "left," "left-side," "right," and "right-side" should generally be interpreted as corresponding to the appropriate directions when viewing the front of the baler 10 while positioned at the back of the baler 10. As such, for example, the left-side of the baler 10 is shown in the foreground of FIG. 1. In view of the above, the baler 10 can pick up crop material from a single windrow that is passed over first by the towing vehicle and then by the baler 10. As such, the baler 10 may, in some embodiments, be configured as an "in-line" baler, as will be discussed in more detail below.

To collect crop material laying on the ground in a windrow, the baler 10 may include a pickup mechanism 16, which is supported on the chassis 12 below the baling chambers 14 (at the front end of the baler 10). The pickup mechanism 16 may be configured to pick up crop material within a single windrow as the baler 10 is advanced along a path of travel by the towing vehicle (i.e., with the path of travel extending over the path presented by the windrow). To facilitate the collection of the crop material, the pickup mechanism 16 may comprise a tined, rotating member, which is configured to pick up the crop material of the windrow off the ground. Upon picking up the crop material, the pickup mechanism 16 will be further configured to transfer the crop material upward and rearward to a rotor housing 18, which may also be positioned below the baling chamber 14 and generally configured to rotatably support a rotor 20 within the rotor housing 18. The rotor 20 may be configured to convey the crop material from the rotor housing 18, rearward to one or more stuffer chutes 22. In some embodiments, the baler 10 may include the same number of stuffer chutes 22 as baling chambers 14, such that crop material may be passed from each stuffer chute 22 into a specific baling chamber 14. For example, the embodiment of the baler 10 illustrated in the figures includes two baling chambers 14. As such, the baler 10 of the figures may correspondingly include two stuffer chutes 22, with each stuffer chute 22 being associated with one baling chamber 14 so as to provide crop material to the associated baling chamber 14.

Thus, the baler 10 is particularly configured to collect crop material from a single windrow and process such crop material into a plurality of crop streams. For example, in embodiments that include two baling chambers 14, the crop material may be provided in a first crop stream to a first of the stuffer chutes 22 (e.g., the left-side stuffer chute 22), and in a second crop stream to a second of the stuffer chutes 22 (e.g., the left-side stuffer chute 22). Crop material from the first crop stream may be transferred through the left-side stuffer chute 22 to the left-side baling chamber 14 for formation of bales of crop material. Similarly, crop material from the second crop stream may be transferred through the right-side stuffer chute 22 to the right-side baling chamber 14 for formation of bales of crop material.

Upon introduction of a charge of crop material into one of the baling chambers 14, the baler 10 is configured to further compress the crop material into a square bale of crop material. As illustrated in FIG. 1, each baling chamber 14 may generally comprise an elongated chamber with a crop inlet at a forward end for receiving charges of crop material from the associated stuffer chute 22 and a bale discharge at a rearward end from which square bales of crop material are discharged from the baling chamber 14 and the baler 10. The crop inlet of each baling chamber 14 may be positioned at the bottom of the baling chamber 14, such that baling chambers are considered "bottom fed," with charges of crop material being provided into the baling chambers from below the baling chambers 14 via associated stuffer chutes 22.

Each baling chamber 14 may include, or otherwise be associated with, a plunger configured to compressing the crop material within the baling chamber 14 to form the square bale of crop material. The plungers may each comprise a generally rectangular head having a size at least nominally smaller than a bailing chamber 14, such that the plunger can reciprocate within a respective baling chamber 14 to compress crop material into a bale. In the embodiments shown in the figures, the baler 10 may include two plungers, with each plunger being associated with one of the baling chambers 14. By having multiple baling chambers 14, each being associated within its own plunger, the baler 10 is configured to simultaneously create multiple bales of crop material, with such crop material being obtained by the baler 10 from a single windrow. In some embodiments, the plungers may both be driven by a single, common gearbox.

In some embodiments, as illustrated in the figures, the baler 10 will include two spaced apart, side-by-side baling chambers 14. Such baling chambers 14 may extend in a generally fore-and-aft direction with respect to the chassis 12. The baling chambers 14 may extend in a generally parallel relationship with each other (and/or with the longitudinal centerline of the of the chassis 12 and/or the baler 10), with one baling chamber 14 positioned on one side of the longitudinal centerline of the chassis 12 of the baler 10, and the other baling chamber 14 positioned on the other side of the longitudinal centerline of the chassis 12 of the baler 10. In some embodiments, the baling chambers 14 may be spaced from one another. Beneficially, having the baling chambers 14 spaced apart can make it simpler to implement mechanisms that handle, accumulate, and/or sort bales that are formed in and dispensed from the baling chambers 14. Nevertheless, in alternative embodiments, the baling chambers 14 may not be spaced apart from each other. For example, the baling chambers 14 may be separated by (or share) a common interior wall, such that no air gap exists between the baling chambers 14. In some further embodiments, the baling chambers 14 may not be separated by any interior walls. For example, four walls may define a common interior baling space that includes two baling chambers 14. As such, the two baling chambers 14 can share a common interior baling space so that two bales can be simultaneously formed within the common interior baling space.

In addition, some embodiments of the baler 10 may include a plurality of knotter assemblies 24 for tying one or more securement lines (e.g., twine, wire, cord, etc.) around the square bales of crop material being formed in the baling chambers 14. In some embodiments, the baler 10 may include one knotter assembly 24 for each baling chamber 14, such that each bale of crop material may be wrapped and tied with securement lines. In some embodiments, each knotter assembly 24 may include a pair of knotting mechanisms, each configured to wrap and tie a securement line around each square bale formed in the associated baling chamber 14. As such, in some embodiments, the baler 10 may provide for each bale of crop material formed in each baling chamber 14 to be tied with two securement lines.

In operation, the baler 10 described above may be configured to simultaneously produce multiple bales of crop material from a single windrow. The number of bales that may be simultaneously formed by the baler 10 is at least partly dependent on the number of baling chambers 14 included in the baler 10. As discussed above, the baler 10 may include a plurality of baling chambers 14. The embodiments shown in the drawings illustrate the baler 10 including two, inline baling chambers 14. However, it should be understood that certain embodiments of the baler 10 may include more than two baling chambers 14 (e.g., three, four, five, six, or more). In general, the baler 10 will be equipped with a number of stuffer chutes 22, stuffer assemblies, plungers, and/or knotter assemblies 24 that corresponds with and/or that is equal to the number of baling chambers 14. As such, the baler 10 will be configured to adequately provide crop material to each of the baling chambers 14 to create the bales of crop material.

The following example illustrates a baler 10 with a pair of baling chambers 14, which can be used to simultaneously form multiple square bales of crop material. As the baler 10 is pulled along its path of travel by the tow vehicle, the pickup mechanism 16 can pick up crop material from a single windrow of crop material. The pickup mechanism 22 functions to pick up the crop material from the ground and to force the crop material upwardly and rearwardly to the rotor housing 18. From the rotor housing 18, the rotor 20 is configured to separate the crop material into multiple streams for provisioning to the stuffer chutes 22. In the exemplary embodiment, the baler 10 may include two stuffer chutes 22, such that the rotor 20 is configured to separate the crop material into two generally equal streams of crop material and to provide one stream to each of the respective stuffer chutes 22 (e.g., the left-side and the right-side stuffer chutes 22).

While the crop material is in the stuffer chutes 22, stuffer assemblies of the stuffer chutes 22 will function to propel the crop material rearward and upward from the lower entrances of the stuffer chutes 22 to the upper exits of the stuffer chutes 22. As the crop material is propelled rearward and upward, the crop material will be pre-compressed due to the restricting size of the stuffer chutes 22. Upon the crop material reaching the upper exits of the stuffer chutes 22, the stuffer assemblies will force charges of the crop material into the baling chambers 14

With charges of crop material being added into the baling chambers 14, the gearbox can actuate the plungers to compress the charges of crop material into flakes that form the bales of crop material. Such actions can be repeated in a cyclical manner, as driven by the gearbox, so as to simultaneously form square bales of crop material in each of the left-side and right-side baling chambers 14. As the bales are moving through each of the baling chambers 14 (e.g., the left-side and right-side baling chambers), the knotter assemblies 24 are configured to wrap and tie securement lines securely around the bales so as to hold the flakes of the bales together.

Upon the bales of crop material being completely formed and tied off with securement lines, the bales may be ejected from ejection ports of the baling chambers 14. In some embodiments, the bales from each of the left-side and right-side baling chambers 14 will be ejected from the bale discharges of their respective baling chambers 14 in an alternating fashion. For example, due to the cyclical, reciprocating action of the left-side and right-side plungers, bales of crop material formed in the left-side baling chamber 14 may be completed in an alternating time periods with respect to bales formed in the right-side baling chamber 14. As such, the bales of crop material formed in the left-side and the right-side baling chambers 14 may be ejected in an alternating fashion. In different embodiments, the bales of crop material formed in the left-side baling chamber 14 may be ejected generally simultaneously as bales formed in the right-side baling chambers 14.

The individual bales formed by the baler 10 may be ejected from the baling chambers 14 in series. For example, the left side baling chamber 14 may eject a first series of first individual bales (i.e., bales formed in a single row), while the right side baling chamber 14 may eject a second series of second individual bales (i.e., bales formed in a single row). Such bales may be ejected onto the ground for pickup by a separate pick-up machine. Unfortunately, it can be cumbersome and time consuming to pick up and/or process bales formed in multiple series or rows. As such, embodiments of the present invention may further comprise a bale handling system, such as bale singulating system (see, e.g., singulator 30 illustrated in FIG. 2), for manipulating and/or combining a first series of first individual bales and a second series of second individual bales into a single row of bales.

In some embodiments, the singulator 30 may form part of the baler 10 and may extend rearward from the baling chambers 14 and/or from the bale-forming areas. For example, the singulator 30 may be connected to the baling chambers 14 and/or to the chassis 12 of the baler 10 in a manner that permits the singulator 30 to receive the first and second individual bales emitted from both the baling chambers 14. Upon receiving the first and second individual bales, the singulator 30 may manipulate the first and second individual bales into a single row of bales that can be deposited onto the ground for efficient pickup by stacking machines, or the bales can be provided to a tow-behind bale accumulator for further sorting or grouping.

Broadly, the singulator 30 may comprises a landing section 32 and an exit section 34. The landing section 32 may comprise a platform configured to receive the first and second individual bales from the baling chambers 14, while the exit section 34 may comprise a platform configured to manipulate the bales into a single row. As such, at least a portion of the landing section 32 may be broad or wide enough to receive at least two side-by-side bales from the baling chambers 14. In contrast, at least a portion of the exit section 34 may be narrow enough (or otherwise configured) to manipulate multiple bales, such as two side-by-side bales, into a single row of bales to be deposited onto the ground, as will be described in more detail below. Although the figures illustrate the landing section 32 and the exit section 34 being separate elements that are perhaps coupled together via a coupling mechanism (e.g., a pivot connection), it should be understood that in some embodiments, the landing section 32 and the exit section 34 may simply comprise different portions of a unitary structure. For example, a top surface of the landing section 32 may be generally continuous with a top surface of the exit section 34.

Figure 2:
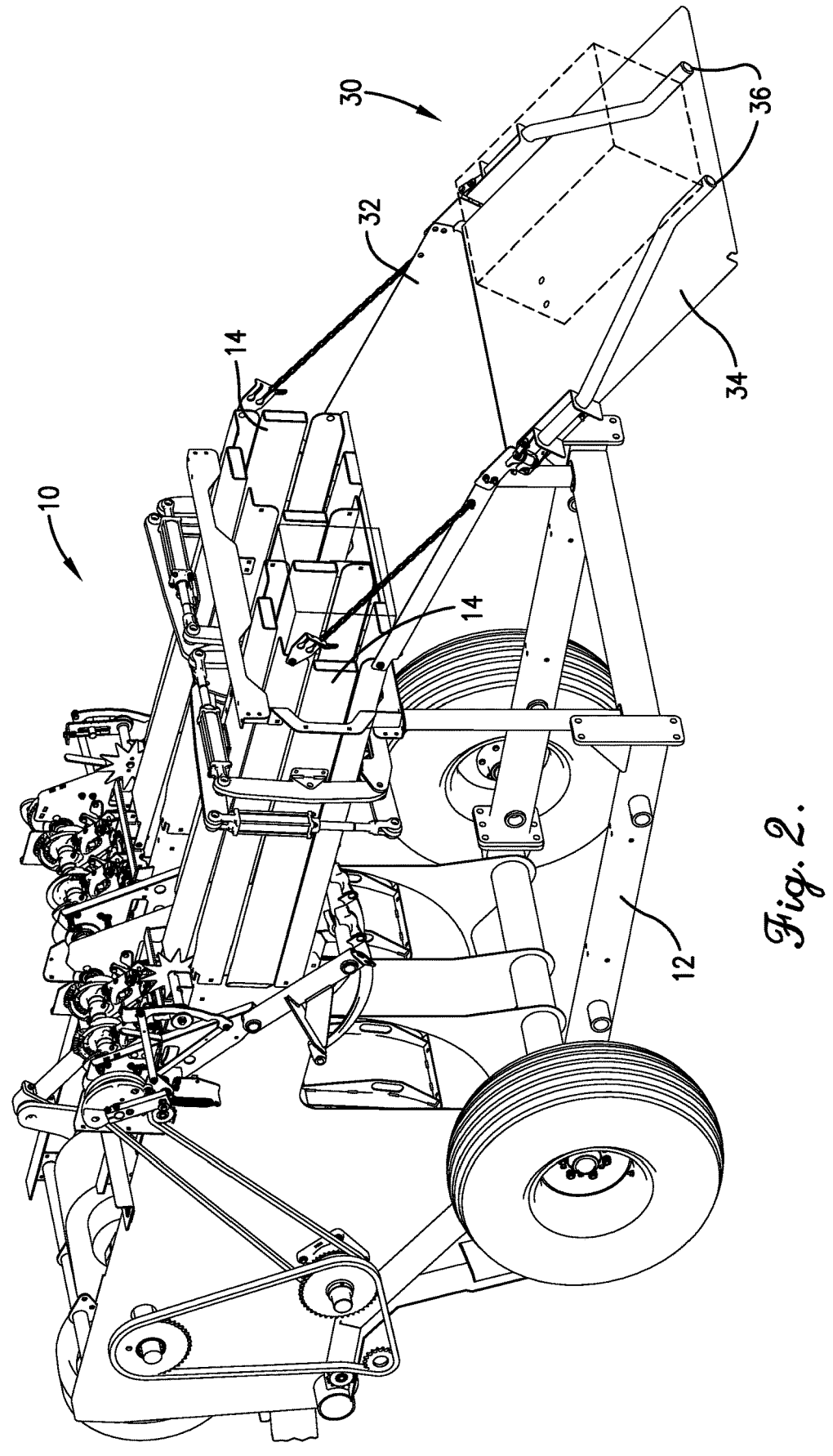
FIG. 2 is a rear perspective view of a portion of the baler from FIG. 1, and further including a bale handling system in the form of a singulator for use with embodiments of the present invention, with the singulator attached to rearward portions of baling chambers of the baler.

Nevertheless, in some embodiments, the landing section 32 may be secured to the rearward ends of the baling chambers 14 and positioned directly below the outlets of the baling chamber 14. For example, as shown in FIG. 2, the landing section 32 may be pivotally secured to a bottom side of the baling chambers 14 and supported in place via chain links that extends between the landing section 32 and an upper side of the baling chambers 14. In other embodiments, the landing section 32 may be secured to the chassis 12 of the baler 10. Nevertheless, in the configuration shown in FIGS. 2 and 3, the bales emitted from the baling chambers 14 can be received onto the landing section 32 in a side-by-side configuration. The landing section 32 may be secured to the baling chambers 14 in such a manner that the landing section 32 is oriented at angle, declining from front to back. As a result, the bales received on the landing section 32 can slide rearward on the landing section 32 under the force of gravity to the exit section 34. The orientation of the landing section 32 may be changed by extending or retracting the length of the chain links, such that the landing section 32 can increase or decrease the declination from the baling chambers 14 (via rotation around the landing section's 32 pivotal link to the baling chambers 14).

The exit section 34 may be secured to a rear side of the landing section 32, such that the exit section 34 is located behind the landing section 32. The exit section 34 may be orientated generally parallel with the landing section 32 such that the exit section 34 may be oriented at angle of decline as it extends from front to back. In some embodiments, the exit section 34 may be pivotally connected to a rear side of the landing section 32 such that the exit section 34 may be selectively orientated at a steeper angle than the landing section 32. Given the declination orientation of the exit section 34, the bales received on the exit section 34 from landing section 32 can slide rearward on the exit section 34 under the force of gravity. Nevertheless, embodiments of the singulator 30 described herein may include various transport mechanisms for moving the first and second individual bales from the landing section 32 to the exit section 34 and off the exit section. In addition to the use of gravity as described above (e.g., via gravity slide or a gravity dump), certain embodiments may include a transport mechanism selected from one or more of the following: a pushing element, a pulling element, an elevator, and a conveyor.

Once the bales arrive at the exit section 34, the exit section 34 may be configured to manipulate the bales into a single, linear row of bales. For example, the singulator 30 may comprise an exit section 34 with a pair of pushing members 36 positioned on left and right sides of the exit section 34. The pusher members 36 may be configured as elongated structural or rigid members that are configured to push (or collectively pinch) bales towards a center of the singulator 30. In particular, a longitudinal centerline or longitudinal vertical plane may extend generally longitudinally (i.e., fore and aft) through the center of the singulator 30. As such, the center of the singulator 30 will generally include the longitudinal centerline or longitudinal vertical plane of the singulator 30.

In more detail, the pusher members 36 may comprise elongated tubular members formed from metal or another material with sufficient strength and durability. The exit section 34 may include one pusher member 36 secured on either lateral side of the exit section 34. A forward portion of a first pusher member 36 may be secured to a left side of the exit section 34, while a forward portion of a second pusher member 36 may be secured to a right side of the exit section 34. As connected to the exit section 34, the forward portions of the left and right pusher members 36 may be spaced apart sufficiently to present a receiving area that is sufficient to receive one or more side-by-side bales. The pusher members 36 may extend rearward and may angle inward along a top surface of the exit section 34. As such, the distance between the left and right pusher members 36 may reduce as the pusher members 36 extend rearward, down the exit section 34. As a result, the pusher members 36 may cooperatively form a funnel shape. In more detail, the rearward portions of the pusher members 36 may be separated only by a distance sufficient to receive a single bale. Such an area (presented between the rearward portions of the pusher members 36) may be defined as an exit area that is narrow enough to not allow receipt of two individual bales positioned side-by-side (i.e., to only allow receipt of one individual bale).

Figure 3:
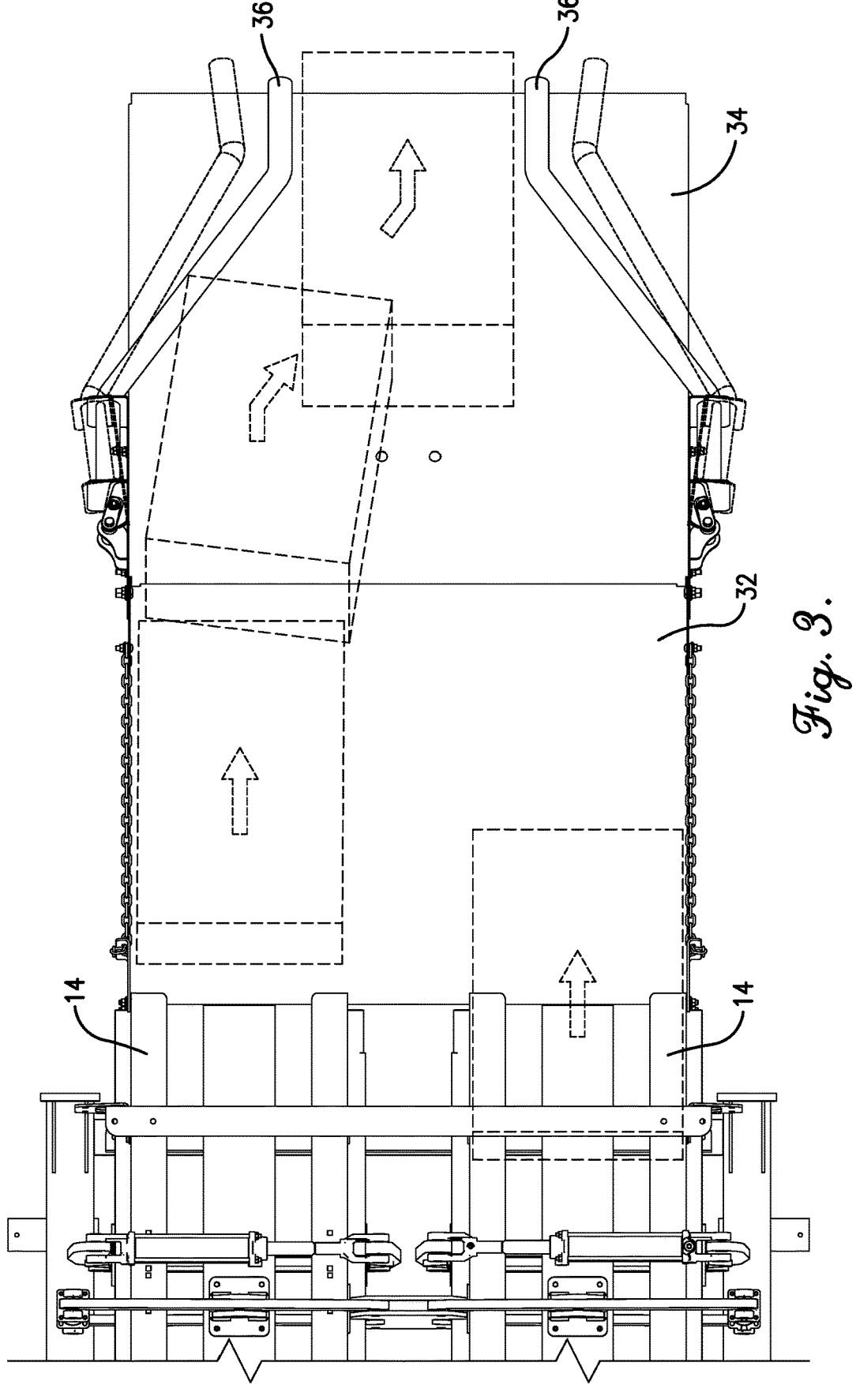
FIG. 3 a top plan view a portion of the baler and of the singulator from FIG. 2, particularly illustrating how a first individual bale and a second individual bale flow though the singulator from the baling chambers into a single row of bales.

In such a configuration, as illustrated by FIG. 3, bales can be released by each of the left and right baling chambers 14 onto the landing section 32. As noted, the landing section 32 may be wide enough to support two, side-by-side bales. The bales can slide (e.g., side-by-side), under the force of gravity, rearward and down the landing section 32. However, once the bales reach the exit section 34, the pusher members 36 can function to singulate the bales into a single row of bales. Specifically, the bales will enter the generally wide receiving area presented between the forward portions of the pusher members 36. As the bales slide rearward, and down the exit section 34, the funnel shape of the pusher members 36 will function to push one of the bales laterally inward towards a center of the exit section 34 (e.g., which may include the longitudinal centerline or longitudinal vertical plane of the singulator 30) as the bales travel down to the exit area presented between the rearward portions of the pusher members 36. As such, one of the pusher members 36 (e.g., a left side pusher member) may be configured to push a first individual bale (e.g., a bale originating from the left side baling chamber 14) toward the center of the exit section 34, while the other pusher member 36 (e.g., a right side pusher member) is configured to push a second individual bale (e.g., a bale originating from the right side baling chamber 14) toward the center of the exit section 34. Such a pushing of the bales to the center of the exit section 34, as illustrated in FIG. 3, can cause the bales to line up in a single, row, where the bales can be dropped off the singulator 30 onto the ground (forming a single row of bales) or can be picked up from the singulator 30. In addition to the generally stationary pusher members 36, certain embodiments may provide for the pusher members 36 to be actuatable, e.g., via hydraulic cylinders. In such embodiments, the pusher members 36 may be selectively/periodically actuated inward, so as to aid in pushing the bales laterally inward toward the center of the exit section 34.

Furthermore, in some embodiments, the pusher members 36 may, in some embodiments be pivotally secured to the exit section 34. Specifically, forward portions of the pusher members 36 may be pivotally secured to the exit section 34 via spring-loaded brackets. Such a pivotal connection allows the pusher members 34 to at least partially flex outwards when a force is applied to inner portions of the pusher members 34. Such flexing may be beneficial to prevent jamming of the singulator 30 when processing bales of various sizes or when the singulator 30 encounters obstacles or debris. For example, FIG. 3 illustrates the pusher members 36 flexing outward as a bale passes through the exit area presented between the pusher members 36. After the bale has completely passed through, the pusher members 36 can return to their original positions via the force of the spring-loaded brackets. As such, the spring-loaded brackets can function to bias the pusher members 36 in a laterally inward position, so as to return to such position after having been flexed outwards.

Regardless of the above description of the singulator 30, in some instances, it has been found that jamming or clogging of the singulator 30 can occur when multiple bales received from each of the left and right baling chamber 14 are provided to the exit section 34. To alleviate such issues, certain embodiments of the singulator 30 may include a stop assembly 40, as illustrated in FIGS. 4 and 5, which is broadly configured to selectively (i) stop/prevent movement of the bales from one of the series of individual bales ejected from the left side baling chamber 14 or the series of individual bales ejected from the right side baling chamber 14, and (ii) allow/permit movement of the bales from the other of the series of individual bales ejected from the left side baling chamber 14 or the series of individual bales ejected from the right side baling chamber 14.

In more detail, as noted above, each of the left and right side baling chambers 14 may eject individual bales in a series. As such, the left side baling chamber 14 will eject a left side series of individual bales, which are received consecutively on the landing section 32 of the singulator 30, while the right side baling chamber 14 will eject a right side series of individual bales, which are received consecutively on the landing section 32 of the singulator 30. Thus, the left and right side series of individual bales are arranged side-by-side on the landing section 32. As illustrated in the embodiment of FIG. 4, the landing section 32 is shown as comprising two spaced apart platforms, with one configured to receive the left side series of individual bales and the other configured to receive the right side series of individual bales.

When the bales from the left and right series of individual bales (arranged side-by-side) pass through the landing section 32 and reach the exit section 34, the singulator 30 (e.g., via the pusher members 36) is configured to manipulate the two series of individual bales into a single, linear series of bales. However, in some instances, bales from the left and right series of individual bales may interfere with each other and/or with the pusher members 36, which can cause jamming or clogging of the singulator 30. To prevent such issues, the stop assembly 40 is configured to selectively allow only bales from either the left side series of individual bales or the right side series of individual bales to pass by (i.e., to pass rearward past the stop assembly 40, through and off the exit section 34), while stopping/preventing bales from the other of the left side series of individual bales or the right side series of individual bales to pass by (i.e., to pass rearward past the stop assembly 40).

In more detail, as illustrated by FIG. 4, the stop assembly 40 may comprise a pair of stop elements 42 that selectively extend up through the platform of the exit section 34 (e.g., above a top surface of the exit section 34) in a manner sufficient to stop/prevent movement of bales from the respective left and right side series of individual bales. Specifically, the exit section 34 may include a pair of openings, formed as slits or gaps in the platform, through which the stop elements 42 are configured to selectively extend. FIG. 4 illustrates both of the left side stop element 42 and the right side stop element 42 in an extended position, such that the stop elements are both extending from under a bottom surface of the exit section 34, upward through the slits in the exit section 34, and above the top surface of the exit section 34. As such, the stop elements 42 are configured to stop/prevent bales from traveling past the stop assembly 40. More particularly, when the left side stop element 42 is locked in an extended position, the left side stop element 42 is configured to stop/prevent movement of the left side series of individual bales. Similarly, when the right side stop element 42 is locked in an extended position, the right side stop element 42 is configured to stop/prevent movement of the right side series of individual bales. Although the drawings illustrate the stop elements 42 extending up through the exit section 34 (i.e., from under a bottom surface of the exit section 34, upward through the slits in the exit section 34, and above the top surface of the exit section 34), it should be understood that the stop elements 42 may be alternatively positioned at various locations on or about the singulator 30. For example, the stop elements 42 (or other configuration of stop elements) may be entirely positioned above or to the side of the exit section 34 so as to be configured to selectively engage with the sides or the tops of bales to selectively prevent such bales from passing through the singulator 30. As a result, it is contemplated that the stop elements 42 may engage with any portion of the bales (e.g., bottoms, sides, or tops of the bales) to selectively prevent the bales from moving through the singulator 30.

Generally, only one of the left or right side stop elements 42 will be locked in the extended position at a given time, with the other of the left or right side stop element 42 being in a retracted position so as to permit/allow bales to pass by (i.e., to pass rearward past the stop assembly 40, through and off the exit section 36). Specifically, in the retracted position, the stop elements 42 will be rotated from the extended position such that the stop elements 42 do not extend above the top surface of the exit section 34. Instead, the stop elements 42 (in the retracted position) will be retained within the slits formed within the exit section 34 and/or will be positioned below the bottom surface of the exit section 34.

To facilitate the selective extension/retraction of the left or right side stop elements 42, the stop assembly 40 includes further components positioned underneath the exit section 34 (e.g., below a bottom surface of the exit section 34), as illustrated in FIG. 5. In more detail, the stop assembly 40 may include a pair of base elements 44 rigidly secured to the bottom surface of the exit section 34 (e.g., via welding or fasteners) and extending downward from the bottom surface. The base elements 44 may function as mounting brackets to secure the remaining components of the stop assembly 40 to the exit section 34 of the singulator 30.

Turning to FIG. 6, a pivot bar may connect the left side base element 44 with the left side stop element 42, such that the left side stop element 42 may rotate about the pivot bar between extended and retracted positions. Similarly, a pivot bar may connect the right side base element 44 with the right side stop element 42, such that the right side stop element 42 may rotate about the pivot bar between extended and retracted positions.

As shown in FIGS. 5 and 6, an elongated cam bar 46 may be rotatingly connected to each of (and extend between) the left and right side base elements 44. Each lateral side of the cam bar 46 may include a pair of lever arms rigidly secured thereto (e.g., via welding). A first lever arm 48 positioned on each end of the cam bar 46, as shown in FIGS. 6 and 7, may be configured as a spring bracket to which a biasing element 50, in the form of a spring, may be secured. The biasing elements 50 may extend from the first lever arms 48 to respective base elements 44. As such, the biasing elements 50 are configured to bias the cam bar 46 (including the pair of lever arms positioned on each end of the cam bar 46) in a neutral position. Specifically, a left side biasing element 50 may extend from the left side first lever arm 48 to the left side base element 44 to bias the cam bar 46 in the neutral position. And a right side biasing element 50 may extend from the right side first lever arm 48 to the right side base element 44 to bias the cam bar 46 in the neutral position. The neutral position of the cam bar 46 is discussed in more detail below In addition, each lateral side of the cam bar 46 may include a second lever arm 52 that is elongated and that extends generally rearward from the cam bar 46. A rearward, distal end of each of the second lever arms 52 may include a laterally extending projection, such as a catch pin 54. In some embodiments, the catch pin 54 may include a cylindrical bearing to facilitate smooth engagement with the associated stop element 42, as will be described in more detail below. In some embodiments, each of the second lever arms 52 may include a biasing element 53 that extends from second lever arm 52 to a respective left and right side stop element 42, so as to bias the stop elements 42 in the extended position. Specifically, a left side biasing element 53 may extend from the left side second lever arm 52 to the left side stop element 42 to bias the left side stop element 42 in the extended position. A right side biasing element 53 may extend from the right side second lever arm 52 to the right side stop element 42 to bias the right side stop element 42 in the extended position. Furthermore, it is noted that when the cam bar 46 is in the neutral position (as maintained by the biasing elements 50), the left and right second lever arms 52 will generally be orientated horizontally/longitudinally (or parallel with the platform of the exit section 34) and will extend rearward from the cam bar 46, as illustrated in FIGS. 6 and 7.

Turning to the stop elements 42 in more detail, and remaining with FIGS. 6 and 7, the left side stop element 42 may comprise an upper portion and a lower portion. In general, the upper portion of the left side stop element 42 may comprise the portion of the left side stop element 42 that extends up from the pivot bar that rotatably connects the left side stop element 42 to the left side base element 44. The lower portion of the left side stop element 42 may comprise the portion that extends down (or generally opposite from the extension of the upper portion) from the pivot bar. The upper portion of the left side stop element 42 may generally comprise an elongated, rigid section of material (e.g., referred to herein as a "shank"), having sufficient length to extend upward through the slit in the exit section 34 of the singulator 30, so as to stop/prevent movement of the left side series of individual bales (when the left side stop element 42 is locked in the extended position).

The lower portion of the left side stop element 42 may comprise a concave, hook element 56, which is configured to receive the catch pin 54 of the left side second lever arm 52. An upper portion of the hook element 56 may comprise a locking section 57, which is sized so as to surround at least half of the catch pin 54. As such, when the catch pin 54 is received within the locking section 57 of the hook element 56 of the left side stop element 42, the left side stop element 42 is prohibited from rotating, as will be discussed in more detail below. Above the hook element 56 (i.e., between the hook element 56 and the shank of the left side stop element 42), a rearward, exterior surface of the left side stop element 42 may be formed as a convex pushing surface 58. As will be described in more detail below, as the left side stop element 42 is rotated, the pushing surface 58 is configured to push down on the catch pin 54 of the left side second lever arm 52, thereby causing rotation of the cam bar 46.

Turning to the right side stop element 42, the stop element 42 may comprise an upper portion and a lower portion. The upper portion of the right side stop element 42 may comprise the portion of the right side stop element 42 that extends up from the pivot bar that rotatably connects the right side stop element 42 to the right side base element 44. The lower portion of the right side stop element 42 may comprise the portion of the right side stop element 42 that extends down (or generally opposite from the extension of the upper portion) from the pivot bar. As with the left side stop element 42, the upper portion of the right side stop element 42 may generally comprise an elongated, rigid section of material (e.g., referred to herein as a "shank") with sufficient length to extend upward through the slit formed in the exit section 34 of the singulator 30, so as to stop/prevent movement of the right side series of individual bales (when the right side stop element 42 is locked in the extended position).

The lower portion of the right side stop element 42 may comprise an arcuate channel 60, which is configured to receive the catch pin 54 of the right side second lever arm 52. A bottom portion of the arcuate channel may include a locking section 62, which is sized so as to surround at least half of the catch pin 54. As such, when the catch pin 54 is received within the locking section 62 of right side stop element 42, the right side stop element 42 is prohibited from rotating, as will be described in more detail below. From the locking section 62, the channel 60 may extend rearward and upward in an arcuate manner. When the catch pin 54 is dislodged from the locking section 62 (e.g., positioned above the locking section 62), the right side stop element 42 is free to rotate, such that the interior surfaces of the channel 60 may force the catch pin 54 downward, causing rotation of the cam bar 46, as discussed in more detail below.

In the configuration described above, the stop assembly 40 functions to selectively stop/prevent movement of the bales from one of the series of individual bales originating from the left side baling chamber 14 or the series of individual bales originating from the right side baling chamber 14, and to permit movement of the bales from the other of the series of individual bales from the left side baling chamber 14 or the series of individual bales from the right side baling chamber 14. Such selective stopping of one of the series of individual bales, reduces the opportunity for bales to interfere with each other as they pass through the singulator 30 thereby preventing jamming or clogging of the singulator 30. To accomplish such manipulation of the bales passing through the singulator 30, the stop assembly 40 is configured such that only one of the left side stop element 42 or the right side stop element 42 can be in a retracted position (i.e., below the exit section 34) at any given time. As such, for example when the left side stop element 42 is not restricting movement of the left side individual bales (i.e., the left side stop element 42 is in the retracted position), the right side stop element 42 is restricting movement of the right side individual bales (i.e., the right side stop element 42 is locked in the extended position). Correspondingly, when the right side stop element 42 is not restricting movement of the right side individual bales (i.e., the right side stop element 42 is in the retracted position), the left side stop element 42 is restricting movement of the left side individual bales (i.e., the left side stop element 42 is locked in the extended position). As such, the stop assembly 40 is configured such that left side stop element 42 and the right side stop element 42 cannot simultaneously be in the retracted position, permitting bales from both the left and right side individual bales to travel past the stop assembly 40.

In more detail, the stop assembly 40 is initially configured such that both of the left and right side stop elements 42 are in the extended position, as illustrated in FIGS. 4, 6, and 7 (i.e., so as to extending up through the slits formed in the exit section 34). Such initial positioning can be maintained by the biasing elements 53 of the stop assembly 40 biasing the stop elements 42 in their extended positions. Furthermore, the cam bar 46 is initially positioned in the neutral position (as maintained by the biasing elements 50), such that the second lever arms 52 extend generally horizontally/rearwardly. As result, the left side catch pin 54 is received within the hook element 56 of the left side stop element 42, but is not retained within the locking section 57 of the hook element 56. Specifically, the left side catch pin 54 is positioned below the locking section 57 of the hook element 56. Similarly, the right side catch pin 54 is received within the channel 60 of the right side stop element 42, but is not retained within the locking section 62 of the channel 60. Specifically, the right side catch pin 54 is positioned above the locking section 62 of the channel 60. As thereby configured, each of the left and right side stop elements 42 are permitted to be rotated when contacted by a bale of crop material traveling across the exit section 34 of the singulator 30.

For example, with reference to FIG. 8, a bale "L," which is an individual bale from the series of bales emitted from the left side baling chamber 14, can contact the shank of the left side stop element 42 (which is in the extended position). The force imparted by the bale L is sufficient to rotate the left side stop element 42 to the retracted position, as illustrated in FIG. 9, such that the shank is positioned within and/or below the slit formed in the exit section 34 of the singulator 30. With the left side stop element 42 in the retracted position, the bale L is free to pass rearwardly by the stop assembly 40. In contrast, however, with the left side stop element 42 in the retracted position, the stop assembly 40 is configured to maintain the right side stop element 42 locked in the extended position so as to stop/prevent individual bales from the right side baling chamber 14 (e.g., bale "R" from FIG. 9) from passing by the stop assembly 40.

In more detail, as the left side stop element 42 is rotated from the extended position to the retracted position, the pushing surface 58 of the stop element 42 contacts the left side catch pin 54 and forces the catch pin 54 downward (See, e.g., FIGS. 9-11). The downward movement of the left side catch pin 54 also forces the left side second lever arm 52 downward, so as to cause a rotation of the cam bar 46 away from the neutral position. Such rotation of the cam bar 46 forces the right side second lever arm 52 downward, correspondingly forcing the right side catch pin 54 down into the locking section 62 of the channel 60 of the right side stop element 42. With the right side catch pin 54 securely received within the locking section 62 of the channel 60, the right side stop element 42 is prevented from rotating (i.e., from the extended position to the retracted position). As such, the shank of the right side stop element 42 is securely maintained in a position extending up through the slit and above the top surface of the exit section 34 of the singulator 30, so as to stop/prevent individual bales from the right side baling chamber 14 (e.g., bale "R" from FIG. 9) from passing by the stop assembly 40.

Once individual bales from the left side baling chamber 14 have stopped passing by the left side stop element 42, the left side stop element 42 is free to rotate from the retracted position back to the extended position (under the biasing force from the biasing element 53). Similarly, the cam bar 46 is free to rotate back to the neutral position (under the biasing force form the biasing elements 50). It is noted that the right side stop element 42 was maintained in the extended position during such above-described transitioning of the left side stop element 42 and cam bar 46. With the cam bar 46 returned to the neutral position, both of the left and right side catch pins 54 are positioned outside of their respective locking sections 57, 62, thereby permitting one of either of the stop elements 42 to be rotated from the extended position down to the retracted position to permit bales to pass thereby.

A similar operation is performed when both of the left and right side stop elements 42 are in the extended position and, with reference to FIG. 12, a bale "R," which is an individual bale from the series of bales emitted from the right side baling chamber 14, contacts the shank of the right side stop element 42 (which is in the extended position). The force imparted by the bale R is sufficient to rotate the left side stop element 42 to the retracted position, as illustrated in FIG. 13, such that the shank is positioned within and/or below the slit formed in the exit section 34 of the singulator 30. With the right side stop element 42 in the retracted position, the bale R is free to pass rearwardly by the stop assembly 40. In contrast, however, with the right side stop element 42 in the retracted position, the stop assembly 40 is configured to maintain the left side stop element 42 locked in the extended position so as to stop/prevent individual bales from the left side baling chamber 14 (e.g., bale "L" from FIG. 13) from passing by the stop assembly 40.

In more detail, as the right side stop element 42 is rotated from the extended position to the retracted position, the interior surfaces of the channel 60 of the stop element 42 contact the right side catch pin 54 and force the catch pin 54 upward (See, e.g., FIGS. 13-15). The upward movement of the right side catch pin 54 also forces the right side second lever arm 52 upward, so as to cause a rotation of the cam bar 46 away from the neutral position. Such rotation of the cam bar 46 forces the left side second lever arm 52 upward, correspondingly forcing the left side catch pin 54 up into the locking section 57 of the hook element 56 of the left side stop element 42. With the left side catch pin 54 securely received within the locking section 57 of the hook element 56, the left side stop element 42 is prevented from rotating (i.e., from the extended position to the retracted position). As such, the shank of the left side stop element 42 is securely maintained in a position extending up through the slit and above the top surface of the exit section 34 of the singulator 30, so as to stop/prevent individual bales from the left side baling chamber 14 (e.g., bale "L" from FIG. 13) from passing by the stop assembly 40.

Once individual bales from the right side baling chamber 14 have stopped passing by the right side stop element 42, the right side stop element 42 is free to rotate from the retracted position back to the extended position (under the biasing force from the biasing element 53). Similarly, the cam bar 46 is free to rotate back to the neutral position (under the biasing force form the biasing elements 50). It is noted that the left side stop element 42 was maintained in the extended position during such above-described transitioning of the left side stop element 42 and cam bar 46. With the cam bar 46 returned to the neutral position, both of the left and right side catch pins 54 are positioned outside of their respective locking sections 57, 62, thereby permitting one of either of the stop elements 42 to be rotated from the extended position down to the retracted position to permit bales to pass thereby.

In view of the above, embodiments of the present invention are configured to receive individual bales from multiple series of bales and to only permit bales from one of the series of bales to pass by at any given time. Specifically, the stop assembly 40 is configured to selectively restrict bales from one of the left side individual bales and the right side individual bales from traveling past the stop assembly 40, and simultaneously permitting bales from the other of the left side individual bales and the right side individual bales to travel past the stop assembly 40.

For instance, embodiments of the present invention may include a method of sorting a plurality of bales of crop material. The method may include an initial step of forming bales of crop material within a first baling chamber 14 and within a second baling chamber 14. An additional step includes dispensing, e.g., onto a singulator 30, a first series of first individual bales from the first baling chamber 14. An additional step includes dispensing, e.g., onto the singulator 30, a second series of second individual bales from the second baling chamber 14. A further step includes, simultaneously (i) permitting bales from one of either the first or second series of individual bales to pass through the singulator 30, and (ii) restricting bales from the other of the first or second series of individual bales to pass through the singulator 30. Such functionality is generally performed by the stop assembly 40 discussed herein, which is configured to include a pair of step elements 42. When one of the stop elements 42 is retracted, so as to permit bales of the associated first or second series of individual bales to pass by the stop assembly 40 (and through the singulator 30), the stop assembly 40 is configured to maintain the other of the stop elements 42 in the extended position so as to restrict bales of the associated first or second series of individual bales to not pass by the stop assembly 40 (and through the singulator 30). Stated differently, the stop assembly 40 is configured to permit only one of the stop elements 42 to be retracted at any given time.

Embodiments of the present invention include another embodiment of a stop assembly, which is illustrated by reference number 70 of FIGS. 16 and 17, which is configured to permit only bales associated with one of the left or right side series of individual bales to pass by the stop assembly 70 (and through the singulator 30), while restricting bales of the associated with the other left or right side series of individual bales to not pass by the stop assembly 70 (and through the singulator 30). The stop assembly 70 may include certain of the same elements as the stop assembly 40 described above. For instance, the stop assembly 70 may include a left side stop element 72 and a right side stop element 74 that are interconnected via a rotating pivot bar 76.

The left side stop element 72 may extend from the left side of the pivot bar 76, and the right side stop element 74 may extend from the right side of the pivot bar 76. However, the left and right side stop elements 72 may extend from the pivot bar 76 at an offset angle of about 90 degrees from each other. For instance, as illustrated in FIGS. 16 and 17. When the left side stop element 72 is in the extended position (i.e., extending upward through the slit formed in the exit section 34 of the singulator 30), the right side stop element 74 is in the retracted position (i.e., extending forward below the slit formed in the exit section 34 of the singulator 30). In such a position, individual bales from the right side series of bales (i.e., emitted from the right side baling chamber 14) are free to pass by the stop assembly 70 and through the singular 30, whereas individual bales from the left side series of bales (i.e., emitted from the left side baling chamber 14) are restricted from passing by the stop assembly 70 and through the singular 30. In contrast, although not shown in drawings, when the right side stop element 74 is in the extended position (i.e., extending upward through the slit formed in the exit section 34 of the singulator 30), the left side stop element 72 is in the retracted position (i.e., extending rearward below the slit formed in the exit section 34 of the singulator 30). In such a position, individual bales from the left side series of bales (i.e., emitted from the left side baling chamber 14) are free to pass by the stop assembly 70 and through the singular 30, whereas individual bales from the right side series of bales (i.e., emitted from the right side baling chamber 14) are restricted from passing by the stop assembly 70 and through the singular 30.

Notably, the stop assembly 70 includes a biasing element 78, e.g., a spring, which biases the stop assembly 70 with the left side stop element 72 in the extended position and the right side stop element 74 in the retracted position. However, when a bale from the left side series of bales contacts the left side stop element 72, such bales force the left side stop element 72 down to the retracted position (so as to permit the left side series of bales to pass by) but, simultaneously, force the right side stop element 74 up to the extended position (so as to restrict the left side series of bales from passing by). As such, and similar to the stop assembly 40, the stop assembly 70 permits only one stop element 72, 74 from being retracted at any one time.

FIG. 18 illustrates another embodiment of a singulator 80 according to embodiments of the present invention. The singulator 80 may comprise, as with the singulators previously described, a landing section 82 and an exit section 84. Such landing and exit sections 82, 84 may function similarly to the landing and exit sections previously described. In contrast, however, the landing section 82 of the singulator 80 may be configured to rotate the bales that are ejected from the baling chambers 14, so as to more efficiently transfer the bales through the singulator 80 and/or to place the bales on the ground surface in a manner that permits efficient pickup of the bales (e.g., by separate bale retrieving machinery).

In more detail, the landing section 82, as illustrated in FIG. 18 comprises two spaced apart receiving areas 82(a) and 82(b), with one configured to receive the left side series of individual bales and the other configured to receive the right side series of individual bales. Each of the receiving areas 82(a), 82(b) the landing section 82 may comprise a main platform and raised platform, with the raised platform positioned vertically higher than the main platform. The main and raised platforms of each of the receiving areas 82(a), 82(b) is positioned directly below the exit of one of the baling chambers 14. However, the raised platforms are only wide enough to support a portion of a width of those bales that are ejected from the baling chambers 14. For example, in some embodiments, the raised platforms are sized to support no more than one-half, one-third, or one-quarter of the width of the bales.

As such, when bales are ejected from the baling chambers 14 (each of the bales having a bottom, a top, and a pair of sides), the bales are initially supported on the raised platforms of the receiving areas 82(a), 82(b) (i.e., the bottoms of the bales are supported on the raised platforms). However, because the raised platforms only support a portion of the bales (e.g., only the right half of the bottom of the bales), the left half of the bales will fall down onto the main platforms. During the falling of such bales, the bales will rotate 90 degrees (about a central, longitudinal axis of the bales), such that one of the sides of the bales will land on and be supported by the main platforms. Thus, the bales will be rotated one-quarter turn (i.e., 90 degrees), to be positioned on edge, as the bales are transferred through and ejected from the singulator 80. In some embodiments, the rearward ends of the raised platforms may include vertically-extending guide elements that are oriented at an angle with respect to a lateral direction of the singulator 80. Such guide elements may assist in forcing the bales off of the raised platforms and rotating down onto the main platforms. Once bales are positioned on the main platforms, other bales being ejected from the baling chambers 14 can force/push the bales on the main platform rearward through the remaining portions of (and off of) the singulator 80.

Although the above-described stop assemblies 40, 70 operated/actuated mechanically, it should be understood that embodiments may provide for stop assemblies to be otherwise operated/actuated. For example, the stop assemblies may be actuated electrically, hydraulically, pneumatically, or the like. In such embodiments, the stop assemblies may be associated with control systems (e.g., an electronic control system, a hydraulic control system, and/or a pneumatic control system) for controlling operation of the stop assemblies.

Embodiments of the present invention include another embodiment of a stop assembly, which is illustrated by reference number 90 of FIG. 19 and is configured to permit only bales associated with one of the left or right side series of individual bales to pass by the stop assembly 90 (and through the singulator 30). The stop assembly 90 may include certain of the same elements as the stop assemblies 40, 70 described above. In contrast, however, the stop assembly 90 may include only a single stop element 92 configured to selectively prevent bales from passing through the singulator 30. The stop element 92 may be positioned on either the left side or the right side of the exit section 34. The stop assembly 90 may also include a gate 94 rotatably secured to the exit section 34 on the other side of the exit section 34, opposite the stop element 92. For example, as shown in FIG. 19, the stop assembly 90 may include the stop element 92 on the left side of the exit section 34 and the gate 94 on the right side of the exit section 34. Alternatively, however, the stop element 92 may be positioned on the right side of the exit section 34 and the gate 94 on the left side of the exit section 34.

Regardless, the stop assembly 90 may be configured such that the gate 94 is operably connected with the stop element 92, such that when the gate 94 is actuated (e.g., by a bale passing through the right side of the exit section 34 and engaging with the gate 94), the stop element 92 will be activated so as to stop bales from passing by the stop element 92 and through the left side of the exit section 34. The gate 94 may be operably connected with the stop element 92 via various control mechanisms, such as mechanical linkages, electronic control elements, pneumatic control elements, or combinations thereof. It should be noted that the gate 94 may, in some embodiments, not be configured to stop bales from passing by the gate 94, but may simply act as a switch to activate the stop element 92 whenever a bale is passing by the gate 94. Thus, in place of the gate 94, various other types of switches may be used, such as depressible buttons, lever arms, trip mechanisms, electronic sensors (i.e., optical switches), or the like.

In operation, the stop assembly 90 is configured to permit only a single row of bales to pass through the singulator 30 to be deposited onto the field. In more detail, if bales are passing along the side of the singulator 30 on which the gate 94 is positioned (e.g., the right side of FIG. 19), the bales passing by the gate 94 will actuate the gate 94 as the bales pass. Although the gate 94 will actuate to permit the bales to pass by, actuation of the gate 94 will cause the stop element 92 on the left side of the singulator 30 to activate so as to prevent any bales on the left side of the singulator 30 from passing by the stop element 92. As such, only a single row of bales (i.e., bales on the right side of the singulator 30) will be permitted to pass through the singulator 30 to be deposited onto the field in a single row. On the other hand, if bales are passing along the side of the singulator 30 on which the stop element 92 is positioned (e.g., the left side of FIG. 19) but no bales are passing along the side of the singulator 30 on which the gate 94 is positioned (e.g., the right side of FIG. 19), then the bales passing on the left side will be permitted to pass because the gate 94 will not be actuated to activate the stop element 92. As such, only a single row of bales (i.e., bales on the left side of the singulator 30) will be permitted to pass through the singulator 30 to be deposited onto the field in a single row.

Having thus described one or more embodiments of the invention, what is claimed as new and desired to be protected by Letters Patent includes the following:

What is claimed is:

1. A bale singulator for a baling machine configured to process crop material into square bales, said bale singulator comprising:
   a landing section configured to receive (i) a first series of first individual bales from a first baling chamber of the baler, and (ii) a second series of second individual bales from a second baling chamber of the baler; and
   an exit section configured to receive the first and second individual bales from said landing section and to form a single row of the first and second individual bales,
   wherein said exit section includes a stop assembly comprising a first stop element configured to selectively restrict movement of the first individual bales,
   wherein said stop assembly is configured such when the second individual bales are passing through said exit section, said first stop element is restricting movement of the first individual bales,
   wherein said stop assembly further comprises a second stop element configured to selectively restrict movement of the second individual bales, wherein said stop assembly is configured such when the first stop element is not restricting movement of the first individual bales the second stop element is restricting movement of the second individual bales, and when the second stop element is not restricting movement of the second individual bales the first stop element is restricting movement of the first individual bales,
   wherein said exit section includes a first opening through which said first stop element is configured to selectively extend, and wherein said exit section includes a second opening through which said second stop element is configured to selectively extend,
   wherein when said first stop element is restricting movement of the first individual bales, said first stop element extends from under a bottom surface of said exit section, through the first opening, and above a top surface of said exit section.

2. The bale singulator of claim 1, wherein when said second stop element is not restricting movement of the second individual bales, said second stop element does not extend above the top surface of said exit section.

3. The bale singulator of claim 1, wherein said landing section is configured to support at least one of the first individual bales and at least one of the second individual bales side-by-side.

4. The bale singulator of claim 1, wherein said exit section is located rearward of said landing section, and wherein at least a portion of said exit section is located below said landing section.

5. The bale singulator of claim 1, wherein said singulator is configured to be attached to a rear of the baling machine.

6. The bale singulator of claim 1, wherein said singulator is configured to rotate each of the square bales one-quarter turn about a longitudinal axis of the square bale.

7. The bale singulator of claim 1, wherein said stop assembly is mechanically actuated.

8. The bale singulator of claim 1, wherein said landing section is separate from and coupled to said exits section.

9. The bale singulator of claim 1, wherein said stop assembly further comprises a switch configured to be actuated by movement of the second individual bales, wherein said stop assembly is configured such when the second individual bales actuate the switch, the switch activates the first stop element to restrict movement of the first individual bales.

10. The bale singulator of claim 9, wherein said switch comprises a lever arm.

11. A bale singulator for a baling machine configured to process crop material into square bales, said bale singulator comprising:

a landing section configured to receive (i) a first series of first individual bales from a first baling chamber of the baler, and (ii) a second series of second individual bales from a second baling chamber of the baler; and an exit section configured to receive the first and second individual bales from said landing section and to form a single row of the first and second individual bales, wherein said exit section includes a stop assembly comprising a first stop element configured to selectively restrict movement of the first individual bales, wherein said stop assembly is configured such when the second individual bales are passing through said exit section, said first stop element is restricting movement of the first individual bales, wherein said stop assembly further comprises a second stop element configured to selectively restrict movement of the second individual bales, wherein said stop assembly is configured such when the first stop element is not restricting movement of the first individual bales the second stop element is restricting movement of the second individual bales, and when the second stop element is not restricting movement of the second individual bales the first stop element is restricting movement of the first individual bales, wherein each of said first stop element and said second stop element is configured to transition between an extended position where the stop element extends above a top surface of said exit section and a retracted position where the stop element does not extend above a top surface of said exit section, wherein said stop assembly further comprise a bar connecting said first stop element and said second stop element, wherein when said first stop element is in a retracted position said bar is rotated such that said second stop element is locked in the extended position.

12. A bale singulator for a baling machine configured to process crop material into square bales, said bale singulator comprising:

a landing section configured to receive (i) a first series of first individual bales from a first baling chamber of the baler, and (ii) a second series of second individual bales from a second baling chamber of the baler; and an exit section configured to receive the first and second individual bales from said landing section and to form a single row of the first and second individual bales, wherein said exit section includes a stop assembly comprising a first stop element configured to selectively restrict movement of the first individual bales, wherein said stop assembly is configured such when the second individual bales are passing through said exit section, said first stop element is restricting movement of the first individual bales, wherein said stop assembly further comprises a second stop element configured to selectively restrict movement of the second individual bales, wherein said stop assembly is configured such when the first stop element is not restricting movement of the first individual bales the second stop element is restricting movement of the second individual bales, and when the second stop element is not restricting movement of the second individual bales the first stop element is restricting movement of the first individual bales, wherein said stop assembly includes one or more locking elements configured to maintain at least one of said first stop element and said second stop element an extended position above the top surface of said exit section.

13. A bale singulator for a baling machine configured to process crop material into square bales, said bale singulator comprising:

a landing section configured to receive (i) a first series of first individual bales from a first baling chamber of the baler, and (ii) a second series of second individual bales from a second baling chamber of the baler; and an exit section configured to receive the first and second individual bales from said landing section and to form a single row of the first and second individual bales, wherein said exit section includes a stop assembly comprising a first stop element configured to selectively restrict movement of the first individual bales, wherein said stop assembly is configured such when the second individual bales are passing through said exit section, said first stop element is restricting movement of the first individual bales, wherein said stop assembly further comprises a second stop element configured to selectively restrict movement of the second individual bales, wherein said stop assembly is configured such when the first stop element is not restricting movement of the first individual bales the second stop element is restricting movement of the second individual bales, and when the second stop element is not restricting movement of the second individual bales the first stop element is restricting movement of the first individual bales, wherein said stop assembly includes at least one bias element configured to bias at least one of said first stop element and said second stop element in an extended position above the top surface of said exit section.

14. The bale singulator of claim 13, wherein said stop assembly is configured to allow only one bale from the side-by-side first and second individual bales to travel past the stop assembly.

15. A bale singulator for a baling machine configured to process crop material into square bales, said bale singulator comprising:

a landing section configured to receive (i) a first series of first individual bales from a first baling chamber of the baler, and (ii) a second series of second individual bales from a second baling chamber of the baler; and an exit section configured to receive the first and second individual bales from said landing section and to form a single row of the first and second individual bales, wherein said exit section includes a stop assembly comprising a first stop element and a second stop element each configured to selectively restrict or permit bales to travel past said stop assembly, wherein said stop assembly is configured such that said first stop element and said second stop element cannot simultaneously permit bales to travel past said stop assembly, wherein said stop assembly includes one or more locking elements configured to maintain at least one of said first stop element and said second stop element an extended position above the top surface of said exit section.

16. The bale singulator of claim 15, wherein said exit section includes a first opening through which said first stop element is configured to selectively extend, and wherein said exit section includes a second opening through which said second stop element is configured to selectively extend.

17. The bale singulator of claim 16, wherein when said first stop element is restricting movement of bales, said first stop element extends from under a bottom surface of said exit section, through the first opening, and above a top surface of said exit section.

18. The bale singulator of claim 17, wherein when said second stop element is not restricting movement of the bales, said second stop element does not extend above the top surface of said exit section.

19. The bale singulator of claim 15, wherein each of said first stop element and said second stop element is configured to transition between an extended position where the stop element extends above a top surface of said exit section and a retracted position where the stop element does not extend above a top surface of said exit section, wherein said stop assembly further comprise a bar connecting said first stop element and said second stop element, wherein when said first stop element is in a retracted position said bar is rotated such that said second stop element is locked in the extended position.

20. The bale singulator of claim 15, wherein said stop assembly includes at least one bias element configured to bias at least one of said first stop element and said second stop element in an extended position above the top surface of said exit section.

21. The bale singulator of claim 15, wherein said singulator is configured to rotate each of the square bales one-quarter turn about a longitudinal axis of the square bale.

22. A method of handling a plurality of bales of crop material, said method comprising the steps of:
    (a) forming bales of crop material within a first baling chamber and within a second baling chamber of a baler;
    (b) ejecting a first series of first individual bales from the first baling chamber onto a landing section of a singulating system and ejecting a second series of second individual bales from the second baling chamber onto the landing section of the singulating system, wherein the first individual bales and the second individual bales are positioned side-by-side on the landing section of the singulating system;
    (c) passing the first and second series of bales from the landing section to an exit section; and
    d selectively restricting, via a stop assembly associated with the singulating system, bales from one of the first individual bales and the second individual bales from traveling past the stop assembly, and simultaneously permitting bales from the other of the first individual bales and the second individual bales to travel past the stop assembly,
    wherein the stop assembly comprising a first stop element and a second stop element each configured to selectively restrict or permit bales to travel past said stop assembly, wherein said stop assembly is configured such that said first stop element and said second stop element do no simultaneously permit bales to travel past said stop assembly, and wherein said stop assembly includes at least one bias element configured to bias at least one of said first stop element and said second stop element in an extended position above the top surface of said the section.

23. The method claim 22, wherein the singulating system comprises an exit section includes a first opening through which the first stop element is configured to selectively extend, and wherein the exit section includes a second opening through which the second stop element is configured to selectively extend.

24. The bale singulator of claim 22, wherein said stop assembly comprises a switch configured to be actuated by movement of the second individual bales, wherein said stop assembly is configured such when the second individual bales actuate the switch, the switch activates the first stop element to restrict movement of the first individual bales.

25. The method of claim 22, further including the step of rotating each of the bales one-quarter turn about a longitudinal axis of the bales.

* * * * *